(12) United States Patent
Jung et al.

(10) Patent No.: US 12,443,312 B2
(45) Date of Patent: *Oct. 14, 2025

(54) DISPLAY DEVICE

(71) Applicant: Samsung Display Co., Ltd., Yongin-Si (KR)

(72) Inventors: Keumdong Jung, Yongin-si (KR); Jinwoo Kim, Yongin-si (KR); Kangwon Lee, Yongin-si (KR); Hyojin Lee, Yongin-si (KR)

(73) Assignee: SAMSUNG DISPLAY CO. LTD, Yongin-si (KR)

( * ) Notice: Subject to any disclaimer, the term of this patent is extended or adjusted under 35 U.S.C. 154(b) by 115 days.

This patent is subject to a terminal disclaimer.

(21) Appl. No.: 18/236,581

(22) Filed: Aug. 22, 2023

(65) Prior Publication Data

US 2024/0086015 A1 Mar. 14, 2024

(30) Foreign Application Priority Data

Sep. 20, 2022 (KR) .......................... 10-2022-0118723

(51) Int. Cl.
*G06F 3/041* (2006.01)
*G09G 3/3266* (2016.01)

(52) U.S. Cl.
CPC ....... *G06F 3/04184* (2019.05); *G09G 3/3266* (2013.01); *G09G 2310/0289* (2013.01); *G09G 2310/0291* (2013.01); *G09G 2354/00* (2013.01)

(58) Field of Classification Search
CPC .............. G06F 3/04184; G09G 3/3266; G09G 2310/0289; G09G 2310/0291; G09G 2354/00
See application file for complete search history.

(56) References Cited

U.S. PATENT DOCUMENTS

| | | | |
|---|---|---|---|
| 9,665,208 B2 | 5/2017 | Kim et al. | |
| 11,366,546 B2 | 6/2022 | Lee et al. | |
| 11,656,716 B2* | 5/2023 | Chang | G06F 3/0446 |
| | | | 345/173 |

(Continued)

FOREIGN PATENT DOCUMENTS

| | | |
|---|---|---|
| KR | 10-2021-0086332 | 7/2021 |
| KR | 10-2372536 | 3/2022 |
| KR | 10-2420486 | 7/2022 |

OTHER PUBLICATIONS

Abidur Rahaman, et al., "LTPO TFT technology for Level Shifter Integrated Gate Driver in UHD 4K Displays", SID 2020 DIGEST, pp. 363-366, Sep. 25, 2020.

(Continued)

*Primary Examiner* — Kenneth B Lee, Jr.
(74) *Attorney, Agent, or Firm* — F. CHAU & ASSOCIATES, LLC

(57) ABSTRACT

A display device including: a display panel; an input sensor disposed on the display panel and including a transmission electrode and a reception electrode; a readout circuit configured to output a low-voltage transmission signal and to receive a reception signal from the reception electrode; and an output circuit configured to convert the low-voltage transmission signal into a transmission signal and to provide the transmission signal to the transmission electrode.

20 Claims, 18 Drawing Sheets

(56) References Cited

U.S. PATENT DOCUMENTS 12,148,362 B2 * 11/2024 Ku ..................... G06F 3/0446

OTHER PUBLICATIONS

Abidur Rahaman, et al., "A High-Gain CMOS Operational Amplifier Using Low-Temperature Poly-Si Oxide TFTs"; IEEE Transactions on Electron Devices, vol. 67, Feb. 2, 2022, pp. 1-5.
Hyunho Kim et al., "A High-Gain Inverter With Low Temperature Poly-Si Oxide Thin-Film Transistors", IEEE Electron Device Letters, vol. 40, Mar. 3 201, pp. 411-414.

* cited by examiner

DISPLAY DEVICE

CROSS-REFERENCE TO RELATED APPLICATION

This application claims priority under 35 U.S.C. § 119 to Korean Patent Application No. 10-2022-0118723 filed on Sep. 20, 2022, in the Korean Intellectual Property Office, the disclosure of which is incorporated by reference herein in its entirety.

TECHNICAL FIELD

Embodiments of the present disclosure described herein relate to a display device, and more particularly, to a display device including an input sensor.

DISCUSSION OF RELATED ART

Multimedia electronic devices, such as TVs, mobile phones, tablet personal computers, navigation systems, and game consoles, are all equipped with a display device for displaying images. These devices may also feature touch-based input methods, in addition to general input methods such as buttons, keyboards, or mice. With this intuitive and easy to use touch-based input method, users can effortlessly enter information and commands.

SUMMARY

Embodiments of the present disclosure provide a display device that can detect a user's input with greater precision.

Embodiments of the present disclosure provide a display device that can lower the production cost of a readout circuit used for detecting a user's input.

According to an embodiment of the present disclosure, there is provided a display device including: a display panel; an input sensor disposed on the display panel and including a transmission electrode and a reception electrode; a readout circuit configured to output a low-voltage transmission signal and to receive a reception signal from the reception electrode; and an output circuit configured to convert the low-voltage transmission signal into a transmission signal and to provide the transmission signal to the transmission electrode.

The low-voltage transmission signal has a voltage level between a first high voltage and a first low voltage, and the transmission signal has a voltage level between a second high voltage and a second low voltage, and the second high voltage is higher than the first high voltage.

The display device may further include: a voltage generator configured to generate a first driving voltage and a second driving voltage, wherein the output circuit receives the first driving voltage and the second driving voltage and outputs the transmission signal that swings between the second high voltage and the second low voltage.

The display panel further includes: a pixel connected to a scan line and a data line; and a scan driving circuit configured to receive the first driving voltage and the second driving voltage and to provide a scan signal to the scan line, and the scan signal swings between the first driving voltage and the second driving voltage.

The readout circuit includes: a receiver configured to receive the reception signal and to output a reception sensing signal; an analog-to-digital converter configured to convert the reception sensing signal into a digital signal and to output a digital sensing signal; a touch processor configured to calculate coordinates of an input of a user based on the digital sensing signal; and a low-voltage transmitter configured to output an output signal as the low-voltage transmission signal.

The output circuit includes a level shifter including at least one transistor.

The output circuit includes an amplifier including at least one transistor.

The display device may further include: a printed circuit board electrically connected to the display panel, wherein the readout circuit is disposed on the printed circuit board and the output circuit is disposed on the display panel.

The output circuit includes: a level shifter configured to convert the low-voltage transmission signal to a first transmission signal and to output the first transmission signal; and an inverter configured to output a second transmission signal by inverting the first transmission signal.

The input sensor includes a first transmission electrode and a second transmission electrode, and the first transmission signal is provided to the first transmission electrode, and the second transmission signal is provided to the second transmission electrode.

According to an embodiment of the present disclosure, there is provided a display device including: a display panel; an input sensor disposed on the display panel and including a plurality of transmission electrodes and a plurality of reception electrodes; a first readout circuit configured to output first low-voltage transmission signals and to receive first reception signals from a first portion of the plurality of reception electrodes; a second readout circuit configured to output second low-voltage transmission signals and to receive second reception signals from a second portion of the plurality of reception electrodes; a first output circuit configured to convert the first low-voltage transmission signals to first transmission signals and to respectively provide the first transmission signals to first ends of the plurality of transmission electrodes; and a second output circuit configured to convert the second low-voltage transmission signals to second transmission signals and to respectively provide the second transmission signals to second ends of the plurality of transmission electrodes.

Each of the first low-voltage transmission signals has a voltage level between a first high voltage and a first low voltage, and each of the second low-voltage transmission signals has a voltage level between the first high voltage and the first low voltage, each of the first transmission signals has a voltage level between a second high voltage and a second low voltage, and each of the second transmission signals has a voltage level between the second high voltage and the second low voltage, and the second high voltage is higher than the first high voltage.

The display device may further include: a voltage generator configured to generate a first driving voltage and a second driving voltage, wherein the first output circuit receives the first driving voltage and the second driving voltage and outputs the first transmission signals, each of which swings between the second high voltage and the second low voltage, and wherein the second output circuit receives the first driving voltage and the second driving voltage and outputs the second transmission signals, each of which swings between the second high voltage and the second low voltage.

The display panel further includes: a pixel connected to a scan line and a data line; and a scan driving circuit configured to receive the first driving voltage and the second driving voltage and to provide a scan signal to the scan line, and the scan signal swings between the first driving voltage and the second driving voltage.

The first readout circuit includes: a receiver configured to receive the first reception signals and to output a reception sensing signal; an analog-to-digital converter configured to convert the reception sensing signal into a digital signal and to output a digital sensing signal; a touch processor configured to calculate coordinates of an input of a user based on the digital sensing signal; and a low-voltage transmitter configured to output an output signal as the first low-voltage transmission signals and the second low-voltage transmission signals.

The first output circuit includes a level shifter including at least one transistor.

The first output circuit includes an amplifier including at least one transistor.

The display device may further include: a printed circuit board electrically connected to the display panel, wherein each of the first readout circuit and the second readout circuit is disposed on the printed circuit board, and the first output circuit and the second output circuit are disposed on the display panel.

The plurality of transmission electrodes of the input sensor include a first transmission electrode and a second transmission electrode.

The first output circuit includes: a level shifter configured to convert one of the first low-voltage transmission signals into a first signal and to output the first signal; and an inverter configured to output a second signal by inverting the first signal, and the first signal is provided to a first end of the first transmission electrode, and the second signal is provided to a first end of the second transmission electrode.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
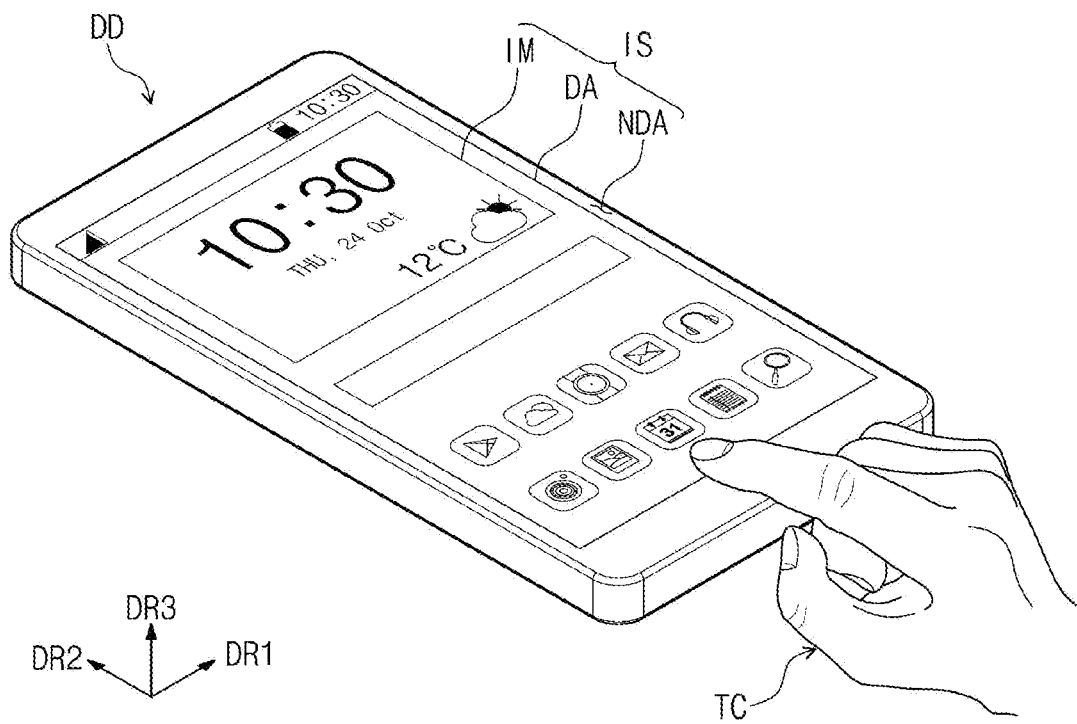
FIG. 1 is a perspective view of a display device, according to an embodiment of the present disclosure.

In the specification, the expression that a first component (or region, layer, part, etc.) is "on", "connected with", or "coupled with" a second component may mean that the first component is directly on, connected with, or coupled with the second component or that a third component is interposed therebetween.

Like reference numerals may refer to like components. In addition, in drawings, the thickness, ratio, and dimension of components may be exaggerated to more effectively describe the technical contents. The term "and/or" may include one or more combinations of the associated listed items.

Although the terms "first", "second", etc. may be used to describe various components, the components should not be construed as being limited by the terms. The terms are used to distinguish one component from another component. For example, a first component may be referred to as a second component, and similarly, the second component may be referred to as the first component. The articles "a," "an," and "the" are singular in that they have a single referent, but the use of the singular form in the specification should not preclude the presence of more than one referent.

In addition, the terms "under", "beneath", "on", "above", etc., may be used to describe a relationship between components illustrated in a drawing. The terms are relative and are described with reference to a direction indicated in the drawing.

It will be understood that the terms "include", "comprise", "have", etc., may specify the presence of features, numbers, steps, operations, elements, or components, described in the specification, or a combination thereof, but not preclude the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in dictionaries commonly used should be interpreted as having a meaning consistent with their meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device DD according to an embodiment of the present disclosure.

As illustrated in FIG. 1, the display device DD may display an image IM through a display surface IS. The display surface IS is parallel to a plane formed by an imaginary line extending in a first direction DR1 and an imaginary line extending in a second direction DR2. The normal direction (e.g., the thickness direction of the display device DD) of the display surface IS may be a third direction DR3.

A front surface (or an upper surface) and a back surface (or a lower surface) of each part or member described later are divided by the third direction DR3. However, the first to third direction DR1, DR2, and DR3 illustrated in an embodiment are only examples.

The display device DD including a flat display surface is illustrated in an embodiment of the present disclosure. However, the present disclosure is not limited thereto. The display device DD may further include a curved display surface. The display device DD may include a three-dimensional (3D) display surface. The 3D display surface may include a plurality of display areas facing in different directions, respectively. For example, the 3D display surface may include a polygonal columnar display surface.

The display device DD according to an embodiment of the present disclosure may be a rigid display device. However, the present disclosure is not limited thereto. For example, the display device DD according to an embodiment of the present disclosure may be a flexible display device. The flexible display device may include a foldable display device, a bending-type display device where a partial area is bent, or a slideable display device.

In an embodiment, FIG. 1 illustrates the display device DD that is applicable to a mobile phone terminal. The display device DD according to an embodiment of the present disclosure may be applied to small and medium-sized electronic devices such as a game machine and a smart watch.

As illustrated in FIG. 1, the display surface IS includes an image area DA, in which the image IM is displayed, and a bezel area NDA adjacent to the image area DA. The bezel area NDA may be an area where an image is not displayed. FIG. 1 illustrates a clock and icon images as an example of the image IM.

As illustrated in FIG. 1, the image area DA may have a substantially-rectangular shape. The "substantially-rectangular shape" includes not only a rectangular shape defined mathematically, but also a rectangular shape in which a boundary of a curve is defined without defining a vertex in a vertex area (or a corner area).

The bezel area NDA may surround the image area DA. However, the present disclosure is not limited thereto. For example, the image area DA and the bezel area NDA may be designed in different shapes. The bezel area NDA may be disposed on only one side of the image area DA. The bezel area NDA may not be exposed to the outside depending on the coupled shape of the display device DD and another component of an electronic device.

The display device DD according to an embodiment of the present disclosure may detect an externally-applied user input TC. The user input TC may be one or a combination of various external inputs such as a part of the user's body, a tool such as a stylus pen, and the like. The display device DD may detect the user input TC by detecting a change in reflection light, temperature, pressure, an ultrasonic wave, or an electromagnetic field, or a combination thereof in response to the user input TC. In an embodiment, it is assumed that the user input TC is a touch input by a user's hand applied to a front surface of the display device DD, but an input scheme of the user input TC is just an example. As described above, the user input TC may be provided in various input schemes. For example, the display device DD may detect the user input TC applied to a side surface or a rear surface of the display device DD depending on a structure of the display device DD, and may not be limited to any one embodiment.

Figure 2:
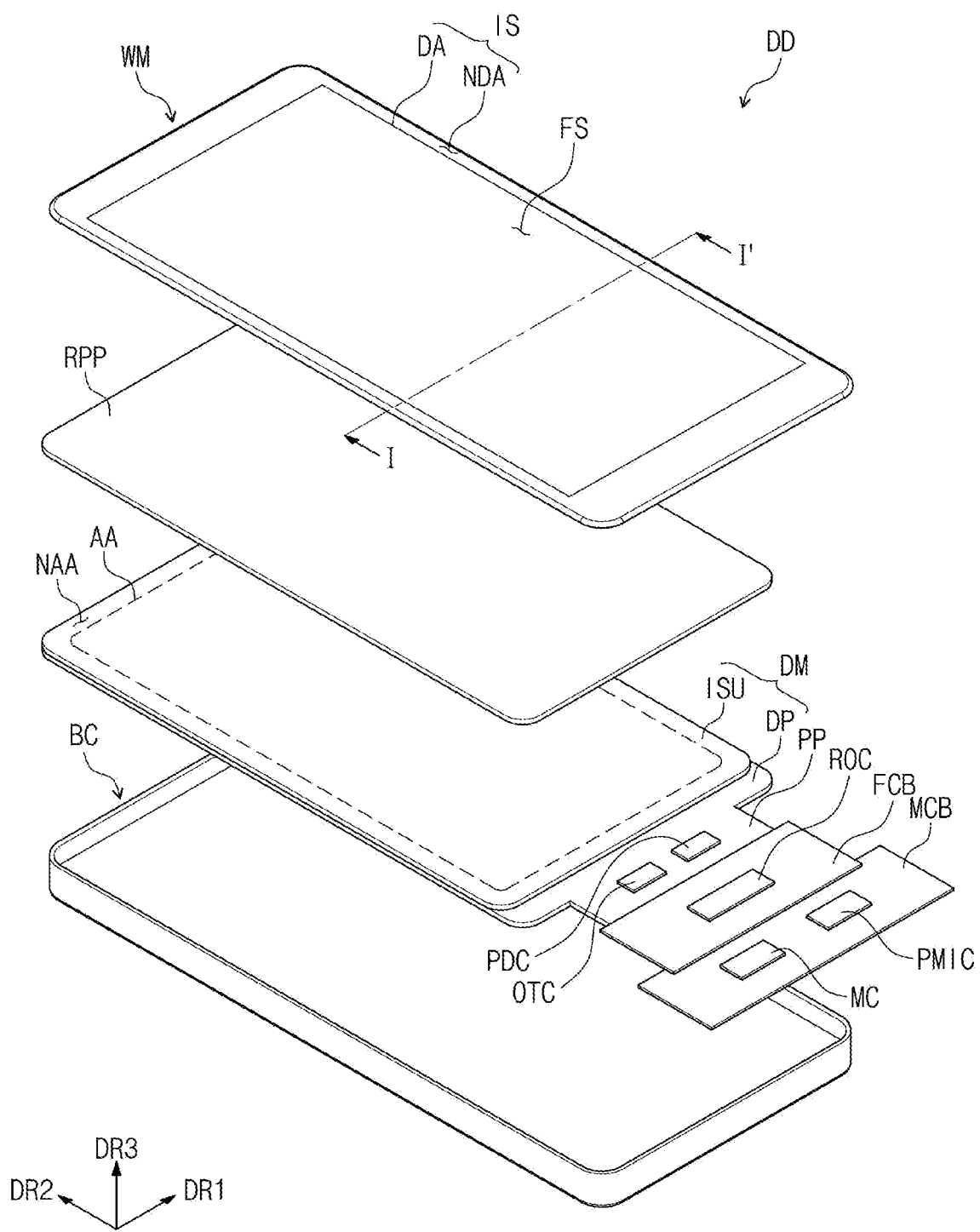
FIG. 2 is an exploded perspective view of a display device, according to an embodiment of the present disclosure.

FIG. 2 is an exploded perspective view of a display device, according to an embodiment of the present disclosure.

Referring to FIGS. 1 and 2, the display device DD may include a window WM, an anti-reflection panel RPP, a display module DM, a printed circuit board FCB, a main circuit board MCB, and a lower case BC. As illustrated in FIGS. 1 and 2, in an embodiment, the display device's DD appearance may be achieved by coupling the window WM and the lower case BC.

The window WM protects an upper surface of the display module DM. The window WM may include an optically transparent insulating material. For example, the window WM may include a front surface FS including glass or plastic. The window WM may include a multi-layer structure or a single layer structure. For example, the window WM may include a plurality of plastic films bonded to each other by an adhesive or may have a glass substrate and a plastic film bonded to each other by an adhesive.

The anti-reflection panel RPP may be disposed under the window WM. The anti-reflection panel RPP reduces a reflectance of external light incident from an upper surface of the window WM. In an embodiment of the present disclosure, the anti-reflection panel RPP may be omitted or may be embedded in the display module DM.

The display module DM may display the image IM and may detect an external input. The display module DM may include a display panel DP and an input sensor ISU.

An active area AA corresponding to the image area DA illustrated in FIG. 1 and a peripheral area NAA corresponding to the bezel area NDA illustrated in FIG. 1 may be formed in the display panel DP. The display panel DP may be a configuration that substantially generates the image IM. The image IM generated in the active area AA of the display panel DP is visibly perceived by a user from the outside through the window WM.

The input sensor ISU detects the external input applied from the outside. The input sensor ISU may detect the user input TC provided to the window WM.

A panel driving circuit PDC and an output circuit OTC may be disposed on one side of the display panel DP. The display panel DP may include a pad area PP. The panel driving circuit PDC and the output circuit OTC may be disposed adjacent to the pad area PP. A plurality of signal pads DP-PD and IS-PD (refer to FIG. 5) may be disposed in a pad area PP (refer to FIG. 5) of the display panel DP. The display panel DP may be electrically connected to the printed circuit board FCB through the signal pads DP-PD and IS-PD. Each of the panel driving circuit PDC and the output circuit OTC may be formed as an integrated circuit to be mounted on the display panel DP.

The printed circuit board FCB may include various driving circuits for driving the display panel DP and the input sensor ISU. In an embodiment, the printed circuit board FCB may include a readout circuit ROC for driving the input sensor ISU. For example, the readout circuit ROC may be configured to transmit signals to and receive signals from the input sensor ISU. The readout circuit ROC may be formed as an integrated circuit to be mounted on the printed circuit board FCB.

In the example shown in FIG. 2, the panel driving circuit PDC and the output circuit OTC are illustrated as being disposed on the display panel DP, but the present disclosure is not limited thereto. As an example, the panel driving circuit PDC and the output circuit OTC may be disposed on the printed circuit board FCB.

The main circuit board MCB may include a main controller MC and a voltage generator PMIC. The main controller MC and the voltage generator PMIC may be electrically connected to the display panel DP and the input sensor ISU through the main circuit board MCB and the printed circuit board FCB. In an embodiment, the voltage generator PMIC may generate voltages necessary for operations of the display panel DP and the input sensor ISU. In other words, the voltage generator PMIC can produce the required voltages for the functioning of both the display panel DP and the input sensor ISU. Voltages generated by the voltage generator PMIC may be provided to the display panel DP and the input sensor ISU through wires formed on the main circuit board MCB and wires formed on the printed circuit board FCB.

The lower case BC may be coupled to the window WM. The lower case BC may include a material having relatively high rigidity. For example, the lower case BC may include glass, plastic, or metal or may include a plurality of frames and/or plates that are composed glass, plastic, or metal of a combination thereof. The lower case BC may stably protect configurations of the display device DD accommodated in the inner space from an external impact.

Figure 3:
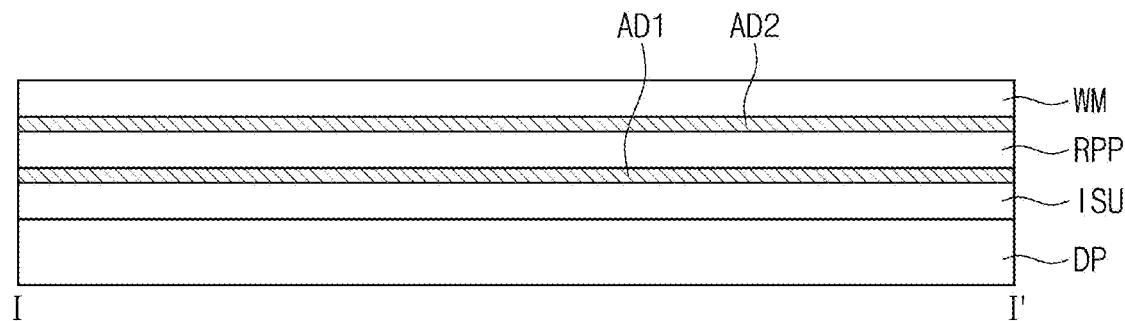
FIG. 3 is a cross-sectional view of a display device taken along line I-I' illustrated in FIG. 2.
Figure 3:

FIG. 3 is a cross-sectional view of a display device taken along line I-I' illustrated in FIG. 2.

FIG. 3 illustrates a cross section of the display device DD in the first direction DR1 and the third direction DR3. FIG. 3 illustrates components of the display device DD to explain a stacked relationship between the components.

According to an embodiment of the present disclosure, the display device DD may include the display panel DP, the input sensor ISU, the anti-reflection panel RPP, and the window WM. At least part of components among the display panel DP, the input sensor ISU, the anti-reflection panel RPP, and the window WM may be formed in successive processes. Alternatively, at least part of the components of the display panel DP, the input sensor ISU, the anti-reflection panel RPP, and the window WM may be coupled with one another by an adhesive member. For example, the input sensor ISU and the anti-reflection panel RPP may be coupled with each other by an adhesive member AD1. The anti-reflection panel RPP and the window WM may be coupled with each other by an adhesive member AD2.

Each of the adhesive members AD1 and AD2 may be a transparent adhesive member such as a pressure sensitive adhesive (PSA) film, an optically clear adhesive (OCA) film, or an optically clear resin (OCR). An adhesive member described later may include a general adhesive or a pressure sensitive adhesive. In an embodiment of the present disclosure, the anti-reflection panel RPP and the window WM may be replaced with other components or may be omitted.

In FIG. 3, the input sensor ISU, which is formed through successive processes together with the display panel DP, from among the input sensor ISU, the anti-reflection panel (e.g., anti-reflector) RPP, and the window WM is directly disposed on the display panel DP. In this specification, "component B is directly disposed on component A" may mean that a separate adhesive layer/member is not interposed between component A and component B. Component B is formed on a base surface, which is provided by component A after component A is formed, through successive processes.

In an embodiment, each of the anti-reflection panel RPP and the window WM may be a "panel" type, and the input sensor ISU may be a "layer" type. A component of the "panel" type includes a base layer providing a base surface, such as a synthetic resin film, a composite film, a glass substrate, or the like. However, the base layer may be omitted in a component of the "layer" type. In other words, components of the "layer" type are disposed on the base surface provided by another component. In an embodiment of the present disclosure, the anti-reflection panel RPP and the window WM may have the "layer" type.

The display panel DP generates an image, and the input sensor ISU obtains coordinate information of an external input (e.g., a touch event). The display device DD according to an embodiment of the present disclosure may further include a protective member disposed on a lower surface (or a bottom surface) of the display panel DP. The protective member and the display panel DP may be bonded through an adhesive member.

The display panel DP according to an embodiment of the present disclosure may be a light emitting display panel, but is not particularly limited thereto. For example, the display panel DP may be an organic light emitting display panel or a quantum dot light emitting display panel. The panels are differentiated based on the material used for the light emitting element. A light emitting layer of the organic light emitting display panel may include an organic light emitting material. A light emitting layer of the quantum dot light emitting display panel may include a quantum dot and/or a quantum rod. Hereinafter, it is described that the display panel DP is an organic light emitting display panel.

The anti-reflection panel RPP reduces a reflectance of external light incident from an upper surface of the window WM. The anti-reflection panel RPP according to an embodiment of the present disclosure may include a retarder and a polarizer. The retarder may be a film type or a liquid crystal coating type. The polarizer may also be a film type or liquid crystal coating type. The film type may include a stretch-type synthetic resin film, and the liquid crystal coating type may include liquid crystals arranged in a given direction. Each of the retarder and the polarizer may further include a protective film. The retarder and polarizer themselves may be a base layer of the anti-reflection panel RPP. Alternatively, the protective film may be the base layer of the anti-reflection panel RPP.

The anti-reflection panel RPP according to an embodiment of the present disclosure may include color filters. The color filters have a predetermined array. An array of color filters may be determined in consideration of light emitting colors of pixels included in the display panel DP. The anti-reflection panel RPP may further include a black matrix adjacent to the color filters.

The anti-reflection panel RPP according to an embodiment of the present disclosure may include a destructive interference structure. For example, the destructive interference structure may include a first reflective layer and a second reflective layer, which are disposed on different layers from each other. First reflected light and second reflected light, which are respectively reflected from the first reflective layer and the second reflective layer, may destructively interfere with each other, thereby reducing the reflectance of external light.

The window WM according to an embodiment of the present disclosure may include a glass substrate and/or a synthetic resin film. The window WM is not limited to a single layer. The window WM may include two or more films that are bonded with one another through an adhesive member. The window WM may further include a functional coating layer. The functional coating layer may include an anti-fingerprint layer, an anti-reflection layer, a hard coating layer, and the like.

The input sensor ISU and the display panel DP will be described in detail later.

Figure 4:
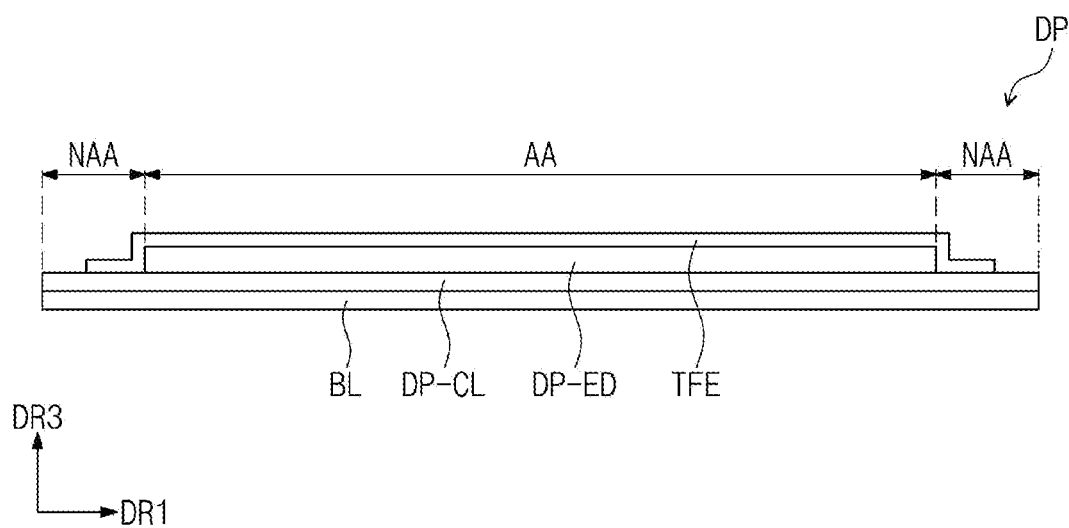
FIG. 4 is a cross-sectional view of a display panel shown in FIG. 3.
Figure 4:
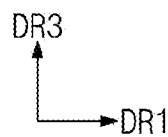

FIG. 4 is a cross-sectional view of the display panel DP shown in FIG. 3.

As illustrated in FIG. 4, the display panel DP includes a base layer BL, a circuit element layer DP-CL disposed on the base layer BL, a light emitting element layer DP-ED disposed on the circuit element layer DP-CL, and a thin film encapsulation layer TFE disposed on the light emitting element layer DP-ED and the circuit element layer DP-CL. The active area AA corresponding to the image area DA illustrated in FIG. 1 and the peripheral area NAA corresponding to the bezel area NDA illustrated in FIG. 1 may be provided in the display panel DP. In this specification, "an area/portion corresponds to another area/portion" may mean "an area/portion overlaps another area/portion", but is not limited to having the same area and/or the same shape.

The base layer BL may include at least one synthetic resin film. The base layer BL may include a glass substrate, a metal substrate, or an organic/inorganic composite substrate.

The circuit element layer DP-CL is disposed on the base layer BL. The circuit element layer DP-CL includes at least one insulating layer and circuit elements. The insulating layer includes at least one inorganic layer and at least one organic layer. The circuit elements may include signal lines, a pixel driving circuit, and the like.

The light emitting element layer DP-ED is disposed on the circuit element layer DP-CL. The light emitting element layer DP-ED includes organic light emitting diodes as light emitting elements. The light emitting element layer DP-ED may further include an organic layer such as a pixel defining layer.

The thin film encapsulation layer TFE may be disposed on the light emitting element layer DP-ED to encapsulate the light emitting element layer DP-ED. The thin film encapsulation layer TFE may cover most of the active area AA. The thin film encapsulation layer TFE may cover a part of the peripheral area NAA.

The thin film encapsulation layer TFE includes a plurality of thin films. A portion of the thin films are disposed to improve optical efficiency. The other portion of the thin films are disposed to protect organic light emitting diodes.

Figure 5:
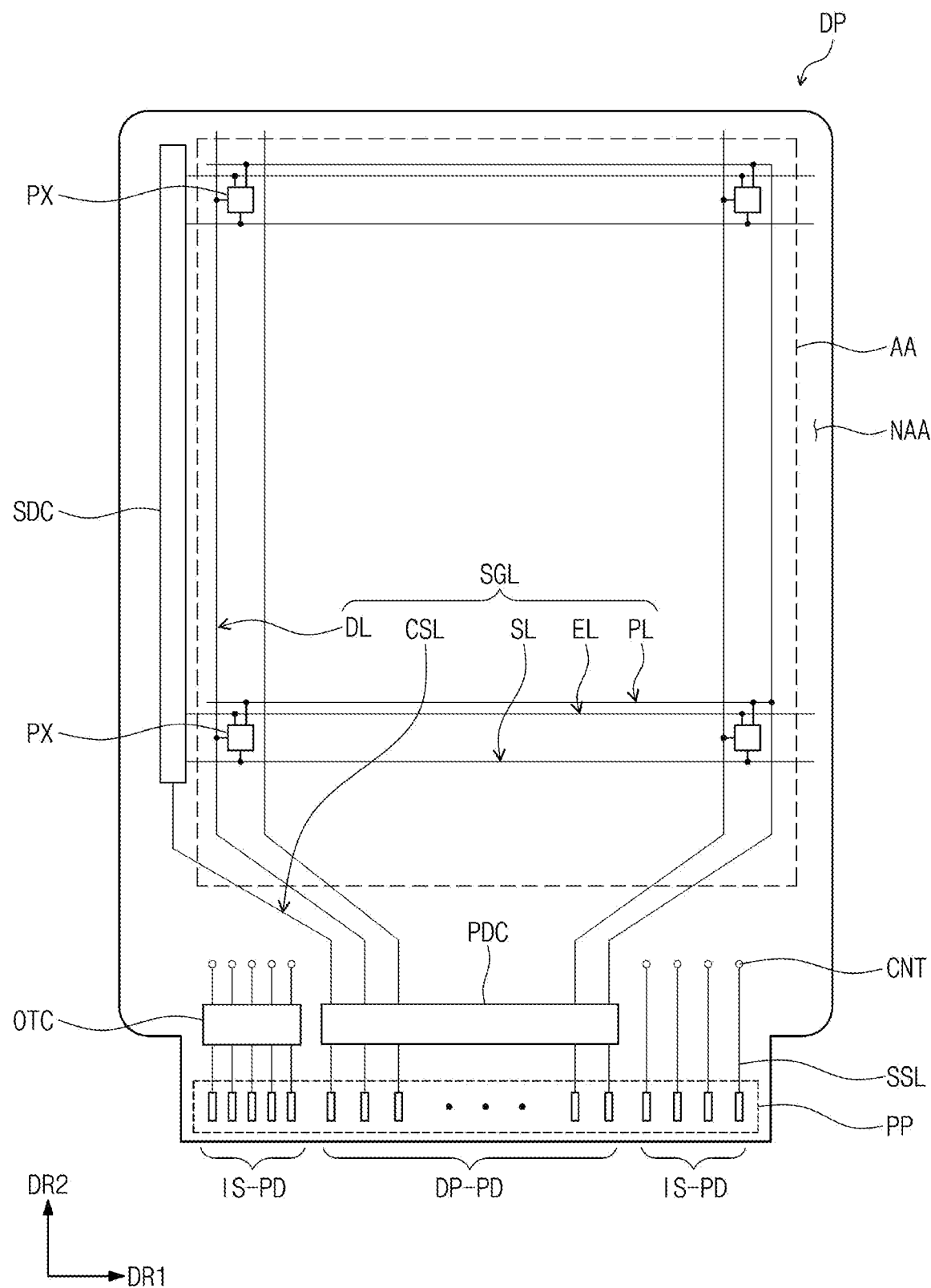
FIG. 5 is a plan view of a display panel, according to an embodiment of the present disclosure.

FIG. 5 is a plan view of the display panel DP, according to an embodiment of the present disclosure.

As illustrated in FIG. 5, the display panel DP may include a scan driving circuit SDC, the output circuit OTC, the panel driving circuit PDC, a plurality of signal lines SGL (hereinafter referred to as "signal lines"), the plurality of signal pads DP-PD and IS-PD (hereinafter referred to as "signal pads"), and a plurality of pixels PX (hereinafter referred to as "pixels").

The scan driving circuit SDC generates a plurality of scan signals (hereinafter referred to as "scan signals") and sequentially outputs the scan signals to a plurality of scan lines SL (hereinafter referred to as "scan lines") to be described later. The scan driving circuit SDC may output not only the scan signals but also other control signals to the pixels PX.

The scan driving circuit SDC may include a plurality of transistors formed through the same process as a process in which transistors in the pixels PX are formed.

The signal lines SGL may include the scan lines SL, data lines DL, a power supply line PL, emission control lines EL, and a control signal line CSL. Each of the scan lines SL is connected to a corresponding pixel PX among the pixels PX; each of the data lines DL is connected to a corresponding pixel PX among the pixels PX; and each of the emission control lines EL is connected to a corresponding pixel PX among the pixels PX. The power supply line PL is connected in common with the pixels PX. The control signal line CSL may provide control signals and driving voltages to the scan driving circuit SDC. The power supply line PL may provide a voltage necessary for operations of the pixels PX. In other words, the power supply line PL is responsible for supplying the required voltage to operate the pixels PX. The power supply line PL may include a plurality of lines that provide different voltages from one another.

In an embodiment, the signal lines SGL may further include auxiliary lines SSL. Each of the auxiliary lines SSL refers to a signal line connected to the input sensor ISU (refer to FIG. 2). In an embodiment of the present disclosure, the auxiliary lines SSL may be omitted. The auxiliary lines SSL are connected to contact holes CNT, respectively. The auxiliary lines SSL may be electrically connected to signal lines of the input sensor ISU (refer to FIG. 6) described later through the contact holes CNT.

The signal pads DP-PD and the signal pads IS-PD may include the first signal pads DP-PD and the second signal pads IS-PD. The first signal pads DP-PD may be electrically connected to the panel driving circuit PDC. A part of the second signal pads IS-PD may be connected to the auxiliary lines SSL, and another part thereof may be electrically connected to the output circuit OTC. In other words, a first portion of the second signal pads IS-PD may be connected to the auxiliary lines SSL, and a second portion of the second signal pads IS-PD may be electrically connected to the output circuit OTC. The first signal pads DP-PD and the second signal pads IS-PD are disposed adjacent to each other in the pad area PP in a partial area of the peripheral area NAA. A stacked structure of the signal pads DP-PD is not distinguished from a stacked structure of the signal pads IS-PD; and, structure materials of the signal pads DP-PD are not distinguished from structure materials of the signal pads IS-PD. The signal pads DP-PD and the signal pads IS-PD may be formed through the same process as each other.

The panel driving circuit PDC may be electrically connected to the data lines DL, the power supply line PL, and the control signal line CSL. The output circuit OTC may be connected to the contact holes CNT via the auxiliary lines SSL.

The active area AA may be an area in which the pixels PX are disposed. A plurality of electronic elements are disposed in the active area AA. The electronic elements include an organic light emitting diode included in each of the pixels PX and a pixel driving circuit connected to the organic light emitting diode. The circuit element layer DP-CL illustrated in FIG. 4 may include the scan driving circuit SDC, the signal lines SGL, the signal pads DP-PD and IS-PD, and the pixel driving circuit.

Each of the pixels PX may include a plurality of transistors, a capacitor, and an organic light emitting diode. The pixels PX emit light in response to signals received through the scan lines SL, the data lines DL, the emission control lines EL, and the power supply line PL.

The first signal pads DP-PD and the second signal pads IS-PD of the display panel DP may be electrically connected to the printed circuit board FCB shown in FIG. 2. In other words, the display panel DP may be electrically connected to the panel driving circuit PDC and the readout circuit ROC of the printed circuit board FCB through the first signal pads DP-PD and the second signal pads IS-PD.

A part of the display panel DP illustrated in FIG. 4 may be bent. In an embodiment, a part of the peripheral area NAA of the display panel DP may be bent and may be bent around a bending axis parallel to the first direction DR1. The bending axis may be defined such that a part of the data lines DL overlaps a part of the auxiliary lines SSL.

Figure 6:
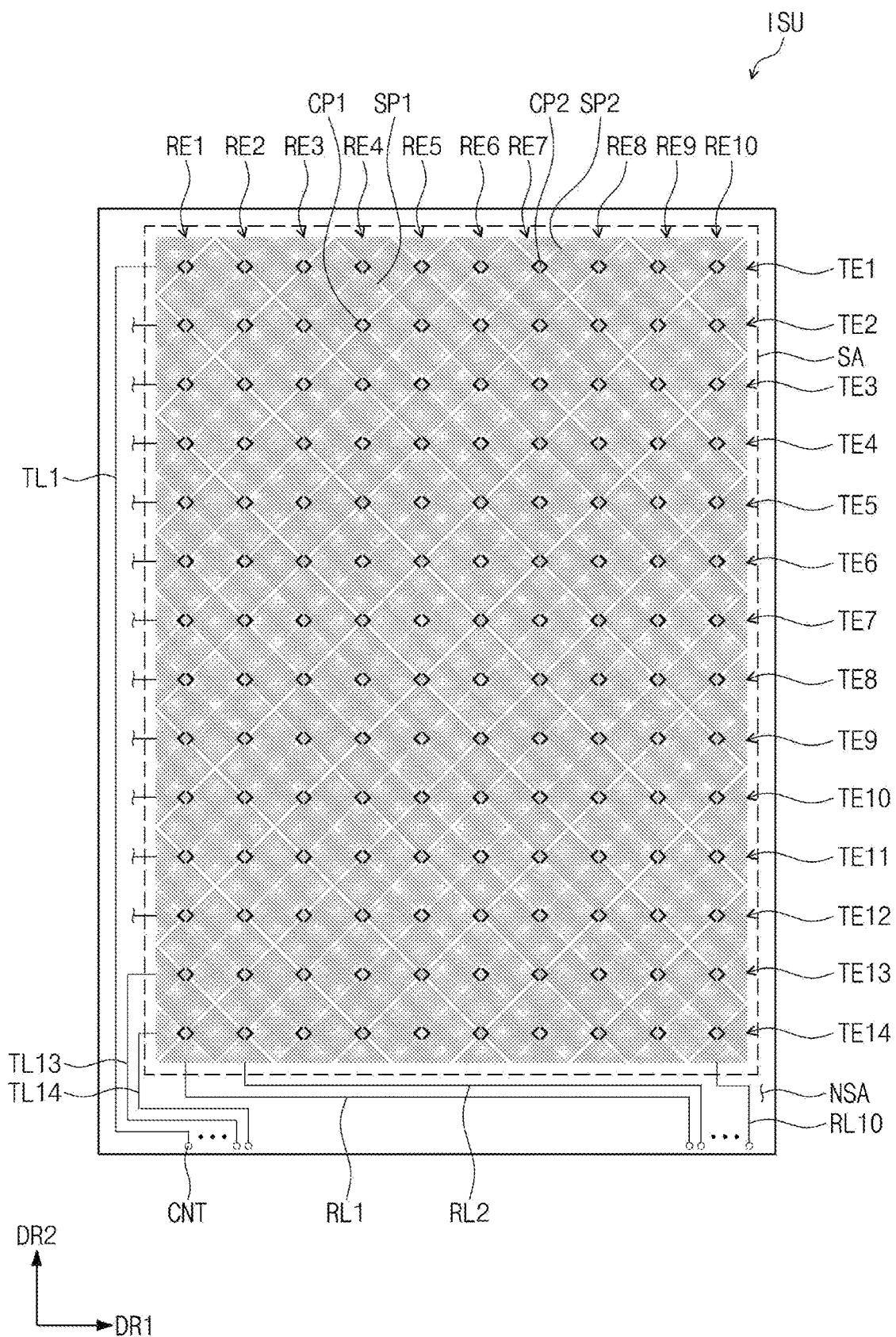
FIG. 6 is a plan view illustrating a configuration of an input sensor, according to an embodiment of the present disclosure.

FIG. 6 is a plan view illustrating a configuration of the input sensor ISU, according to an embodiment of the present disclosure.

Referring to FIG. 6, the input sensor ISU may include a sensing area SA and a non-sensing area NSA. The sensing area SA may be an area activated depending on an electrical signal. For example, the sensing area SA may be an area in which an input is sensed. The non-sensing area NSA may surround the sensing area SA. The sensing area SA may correspond to the active area AA of FIG. 5, and the non-sensing area NSA may correspond to the peripheral area NAA of FIG. 5.

The input sensor ISU includes transmission electrodes TE1, TE2, TE3, TE4, TE5, TE6, TE7, TE8, TE9, TE10, TE11, TE12, TE13 and TE14 (or first sensing electrodes) and reception electrodes RE1, RE2, RE3, RE4, RE5, RE6, RE7, RE8, RE9 and RE10 (or second sensing electrodes). The transmission electrodes TE1 to TE14 and the reception electrodes RE1 to RE10 are arranged in the sensing area SA. The transmission electrodes TE1 to TE14 and the reception electrodes RE1 to RE10 are electrically insulated from each other and cross each other in the sensing area SA. In an embodiment of the present disclosure, the input sensor ISU includes the first to fourteenth transmission electrodes TE1 to TE14 and the first to tenth reception electrodes RE1 to RE10, but the present disclosure is not limited thereto. The number of transmission electrodes and the number of reception electrodes may be variously changed. FIG. 6 illustrates that the number of transmission electrodes is greater than the number of reception electrodes. However, in an embodiment, the number of reception electrodes may not be less than the number of transmission electrodes.

In this specification, to clearly distinguish between the electrodes TE1 to TE14 and the electrodes RE1 to RE10, the electrodes TE1 to TE14 are referred to as "transmission electrodes", and the electrodes RE1 to RE10 are referred to as "reception electrodes. However, functions of the electrodes are not limited to the names. Depending on an operating mode, the transmission electrodes TE1 to TE14 may operate as reception electrodes as well as transmission electrodes, and the reception electrodes RE1 to RE10 may operate as transmission electrodes as well as reception electrodes.

Each of the first to fourteenth transmission electrodes TE1 to TE14 may extend in the first direction DR1. The first to fourteenth transmission electrodes TE1 to TE14 may be spaced from each other in the second direction DR2. The first to fourteenth transmission electrodes TE1 to TE14 may be electrically isolated from each other. Each of the first to fourteenth transmission electrodes TE1 to TE14 includes second sensing patterns SP2, which are spaced from one another in the first direction DR1, and second connection patterns CP2 electrically connecting the second sensing patterns SP2. The second sensing patterns SP2 and the second connection patterns CP2 may have an integral shape.

Each of the first to tenth reception electrodes RE1 to RE10 extends in the second direction DR2. The first to tenth reception electrodes RE1 to RE10 may be spaced from one another in the first direction DR1. The first to tenth reception electrodes RE1 to RE10 may be electrically isolated from each other. The first to tenth reception electrodes RE1 to RE10 may cross the first to fourteenth transmission electrodes TE1 to TE14 and may be electrically insulated from the first to fourteenth transmission electrodes TE1 to TE14. Each of the first to tenth reception electrodes RE1 to RE10 includes the first sensing patterns SP1, which are spaced from one another in the second direction DR2, and first connection patterns CP1 electrically connecting the first sensing patterns SP1. The first sensing patterns SP1 and the first connection patterns CP1 are disposed on different layers.

FIG. 6 illustrates the first sensing patterns SP1 and the second sensing patterns SP2 having a rhombus shape, but the present disclosure is not limited thereto. The first sensing patterns SP1 and the second sensing patterns SP2 may have different polygonal shapes from one another.

The first to fourteenth transmission electrodes TE1 to TE14 and the first to tenth reception electrodes RE1 to RE10 may have a mesh shape. As the first to fourteenth transmission electrodes TE1 to TE14 and the first to tenth reception electrodes RE1 to RE10 have a mesh shape, a parasitic capacitance with electrodes (e.g., a second electrode CE (refer to FIG. 7)) of the display panel DP (refer to FIG. 5) may be reduced.

The input sensor ISU may obtain location information about an external input through a change in mutual capacitance between the first to fourteenth transmission electrodes TE1 to TE14 and the first to tenth reception electrodes RE1 to RE10.

The input sensor ISU may further include first to fourteenth transmission lines TL1 to TL14 (or first signal lines) and first to tenth reception lines RL1 to RL10 (or second signal lines). The first to fourteenth transmission lines TL1 to TL14 and the first to tenth reception lines RL1 to RL10 may be disposed in the non-sensing area NSA. The first to fourteenth transmission lines TL1 to TL14 are electrically connected to sides of the transmission electrodes TE1 to TE14, respectively. For example, the first to fourteenth transmission lines TL1 to TL14 may be electrically connected to one side of each of the transmission electrodes TE1 to TE14. The first to tenth reception lines RL1 to RL10 are electrically connected to sides of the reception electrodes RE1 to RE10, respectively. However, the present disclosure is not limited thereto. For example, the first to tenth reception lines RL1 to RL10 may be electrically connected to one side of each of the reception electrodes RE1 to RE10. In an embodiment, the input sensor ISU may further include transmission lines electrically respectively connected to both sides of the first to fourteenth transmission electrodes TE1 to TE14.

One end of each of the first to fourteenth transmission lines TL1 to TL14 and one end of each of the first to tenth reception lines RL1 to RL10 may be electrically connected to the auxiliary lines SSL illustrated in FIG. 5 through the contact hole CNT.

The input sensor ISU is electrically connected to the readout circuit ROC (refer to FIG. 2) through the first to fourteenth transmission lines TL1 to TL14 and the first to fourteenth receiving lines RL1 to RL10. The readout circuit ROC may control an operation of the input sensor ISU.

Figure 7:
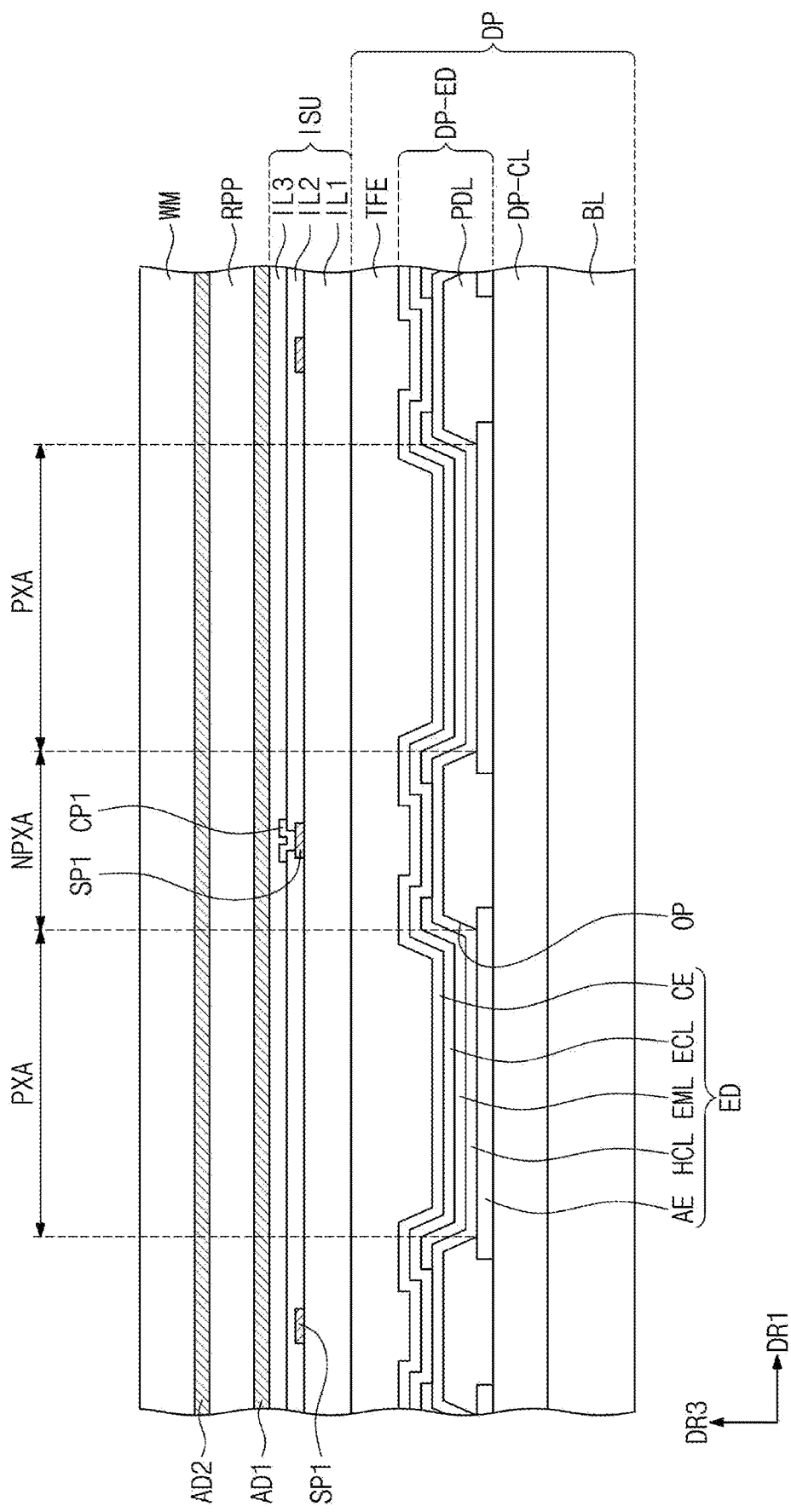
FIG. 7 is a cross-sectional view of a display device, according to an embodiment of the present disclosure.

FIG. 7 is a cross-sectional view of a display device, according to an embodiment of the present disclosure.

As illustrated in FIG. 7, the display panel DP includes the base layer BL, the circuit element layer DP-CL disposed on the base layer BL, the light emitting element layer DP-ED, and the thin film encapsulation layer TFE. The display panel DP may further include functional layers such as an anti-reflection layer, a refractive-index adjustment layer, and the like.

The base layer BL may include a synthetic resin layer. The synthetic resin layer is formed on a working substrate used when the display panel DP is manufactured. Afterward, a conductive layer, an insulating layer, and the like are formed on the synthetic resin layer. When the working substrate is removed, the synthetic resin layer corresponds to the base layer BL. The synthetic resin layer may be a polyimide-based resin layer, and the material thereof is not particularly limited thereto. In addition, the base layer BL may include a glass substrate, a metal substrate, an organic/inorganic composite substrate, or the like.

The circuit element layer DP-CL includes at least one insulating layer and a circuit element. Hereinafter, the insulating layer included in the circuit element layer DP-CL is referred to as an "intermediate insulating layer". The intermediate insulating layer includes at least one intermediate inorganic film and at least one intermediate organic film. The circuit element includes a signal line, a driving circuit of a pixel, and the like. The circuit element layer DP-CL may be formed through a process of forming an insulating layer, a semiconductor layer, and a conductive layer by coating, deposition, or the like, and a process of patterning the insulating layer, the semiconductor layer, and the conductive layer by a photolithography process.

The light emitting element layer DP-ED may include a pixel defining layer PDL and the light emitting element ED. The pixel defining layer PDL may include organic materials. A first electrode AE is disposed on the circuit element layer DP-CL. The pixel defining layer PDL is formed on the first electrode AE. An opening OP is provided on a pixel defining layer PDL. The opening OP of the pixel defining layer PDL exposes at least part of the first electrode AE. In an embodiment of the present disclosure, the pixel defining layer PDL may be omitted.

A hole control layer HCL may be disposed on the first electrode AE. A light emitting layer EML is disposed on the hole control layer HCL. The light emitting layer EML may be disposed in an area corresponding to the opening OP. In other words, the light emitting layer EML may be separately formed on each of pixels PX (refer to FIG. 5). The light emitting layer EML may include an organic material and/or an inorganic material. The light emitting layer EML may generate a predetermined colored light.

An electron control layer ECL is disposed on the light emitting layer EML. A second electrode CE is disposed on the electron control layer ECL. The second electrode CE is disposed in the pixels PX in common.

The thin film encapsulation layer TFE is disposed on the second electrode CE. The thin film encapsulation layer TFE encapsulates the light emitting element layer DP-ED. The thin film encapsulation layer TFE includes at least one insulating layer. The thin film encapsulation layer TFE according to an embodiment of the present disclosure may include at least one inorganic film (hereinafter, referred to as an "encapsulation inorganic film"). The thin film encapsulation layer TFE according to an embodiment of the present disclosure may include at least one organic film (hereinafter, referred to as an "encapsulation organic film") and at least one encapsulation inorganic film.

The encapsulation inorganic film protects the light emitting element layer DP-ED from moisture or oxygen. The encapsulation organic film protects the light emitting element layer DP-ED from foreign objects such as dust particles. The encapsulation inorganic film may include a silicon nitride layer, a silicon oxynitride layer, a silicon oxide layer, a titanium oxide layer, an aluminum oxide layer, or the like, but is not limited thereto. The encapsulation organic film may include an acryl-based organic film, and is not limited thereto.

The input sensor ISU includes a base layer IL1, first and second conductive layers disposed on the base layer IL1, and first and second insulating layers IL2 and IL3. The base layer IL1 may include an inorganic material, for example, a silicon nitride layer. The inorganic material disposed on the uppermost side of the thin film encapsulation layer TFE may also include silicon nitride. The base layer IL1 and the silicon nitride layer of the thin film encapsulation layer TFE may be formed under different deposition conditions.

A first conductive layer is disposed on the base layer IL1. The first conductive layer may include the first sensing pattern SP1, the second sensing pattern SP2, and the second connection pattern CP2. A second conductive layer is disposed on the first conductive layer. The second conductive layer may include the first connection pattern CP1. The first insulating layer IL2 is interposed between the first conductive layer and the second conductive layer. The first insulating layer IL2 separates the first conductive layer and the second conductive layer on a cross-section. A contact hole for partially exposing the first sensing pattern SP1 may be provided in the first insulating layer IL2. The first connection pattern CP1 may be connected to the first sensing pattern SP1 through the contact hole. The second insulating layer IL3 is disposed on the first insulating layer IL2. The second insulating layer IL3 may cover the second conductive layer. The second insulating layer IL3 protects the second conductive layer from an external environment.

Mesh lines of the first sensing pattern SP1 and the second sensing pattern SP2 may form a plurality of mesh holes. The mesh lines may have a three-layer structure of titanium/aluminum/titanium.

In a display device according to an embodiment of the present disclosure, the input sensor ISU may be directly disposed on the display panel DP. For example, the input sensor ISU may be directly disposed on the thin film encapsulation layer TFE. In this specification, "being directly disposed" may mean that an adhesive film is not disposed between the input sensor ISU and the display panel DP. In other words, the input sensor ISU may be formed on the display panel DP through successive processes. In this case, the input sensor ISU may be expressed as an input sensing layer.

A portion where the first electrode AE and the light emitting layer EML are arranged may be referred to as a "pixel area PXA". The pixel areas PXA may be spaced from one another in each of the first direction DR1 and the second direction DR2 (refer to FIG. 5). A non-pixel area NPXA is interposed between the pixel areas PXA and may surround the pixel areas PXA.

The anti-reflection panel RPP may be disposed on the upper surface of the input sensor ISU. As an example of the present disclosure, the anti-reflection panel RPP may include a polarizing film. The anti-reflection panel RPP may further include a protective film and other functional films in addition to the polarizing film. Hereinafter, only the polarizing film is illustrated for convenience of description. The adhesive member AD1 may be interposed between the anti-reflection panel RPP and the input sensor ISU. For example, the adhesive member AD1 may be disposed between the anti-reflection panel RPP and the second insulating layer IL3. Accordingly, the anti-reflection panel RPP may be coupled to the input sensor ISU by the adhesive member AD1. The window WM may be coupled to the anti-reflection panel RPP through the adhesive member AD2.

Retuning to FIG. 6, the input sensor ISU may be a capacitive touch sensor. For example, one of the first to fourteenth transmission electrodes TE1 to TE14 and the first to tenth reception electrodes RE1 to RE10 receives a transmission signal. Another of the first to fourteenth transmission electrodes TE1 to TE14 and the first to tenth reception electrodes RE1 to RE10 outputs a capacitance change amount between the first to fourteenth transmission electrodes TE1 to TE14 and the first to tenth reception electrodes RE1 to RE10, as a sensing signal. For example, when the first transmission electrode TE1 receives a transmission signal (or a drive signal), the first transmission electrode TE1 is capacitively coupled to the first to tenth reception electrodes RE1 to RE10. When a part of a user's body is positioned on a specific reception electrode (e.g., the first reception electrode RE1) among the first to tenth reception electrodes RE1 to RE10 that are capacitively coupled, a capacitance between the first transmission electrode TE1 and the first reception electrode RE1 is changed. The readout circuit ROC (refer to FIG. 2) may detect the changed capacitance of the sensing signal received from the first reception line RL1 connected to the first reception electrode RE1 and then may calculate coordinate information of the user's touch location.

Figure 8:
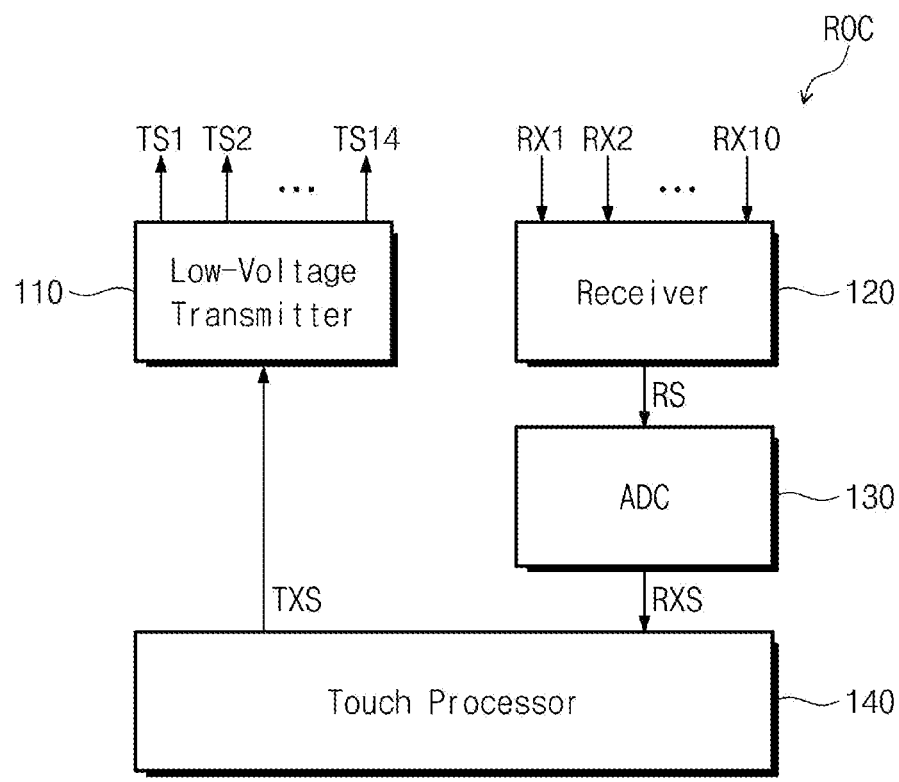
FIG. 8 is a block diagram showing a circuit configuration of a readout circuit, according to an embodiment of the present disclosure.

FIG. 8 is a block diagram showing a circuit configuration of the readout circuit ROC, according to an embodiment of the present disclosure.

Referring to FIG. 8, the readout circuit ROC includes a low-voltage transmitter 110, a receiver 120, an analog-to-digital converter (ADC) 130, and a touch processor 140.

The touch processor 140 may control operations of the low-voltage transmitter 110, the receiver 120, and the ADC 130.

The touch processor 140 may generate an output signal TXS to be transmitted to the input sensor ISU (refer to FIG. 6) and may receive a signal, which is received from the input sensor ISU, as a digital sensing signal RXS.

The low-voltage transmitter 110 converts the output signal TXS provided from the touch processor 140 into first to fourteenth low-voltage transmission signals TS1 to TS14 and outputs the first to fourteenth low-voltage transmission signals TS1 to TS14. The first to fourteenth low-voltage transmission signals TS1 to TS14 may be provided to the output circuit OTC shown in FIG. 6.

The receiver 120 receives first to tenth reception signals RX1 to RX10 from first to tenth reception lines RL1 to RL10 shown in FIG. 6 and outputs a reception sensing signal RS.

The ADC 130 converts the reception sensing signal RS into a digital signal and outputs a digital sensing signal RXS. The digital sensing signal RXS may be provided to the touch processor 140.

The touch processor 140 may calculate coordinate information about the user input TC from the input sensor ISU based on the output signal TXS and the digital sensing signal RXS.

Figure 9:
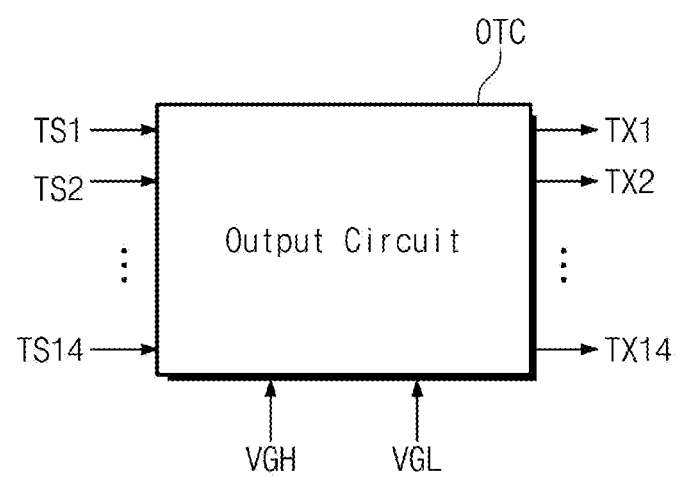
FIG. 9 is a block diagram illustrating an output circuit, according to an embodiment of the present disclosure.

FIG. 9 is a block diagram illustrating the output circuit OTC, according to an embodiment of the present disclosure.

Referring to FIGS. 8 and 9, the output circuit OTC receives the first to fourteenth low-voltage transmission signals TS1 to TS14 provided from the low-voltage transmitter 110 of the readout circuit ROC.

The output circuit OTC outputs the first to fourteenth transmission signals TX1 to TX14 obtained by changing voltage levels of the first to fourteenth low-voltage transmission signals TS1 to TS14. The first to fourteenth transmission signals TX1 to TX14 may be provided to first to fourteenth transmission lines TL1 to TL14 of the input sensor ISU illustrated in FIG. 6.

The output circuit OTC receives a first driving voltage VGH and a second driving voltage VGL. The first driving voltage VGH and the second driving voltage VGL may be provided from the voltage generator PMIC shown in FIG. 2. The output circuit OTC may output the first to fourteenth transmission signals TX1 to TX14, each of which swings between the first driving voltage VGH and the second driving voltage VGL.

In an embodiment, the first driving voltage VGH and the second driving voltage VGL may be provided from the panel driving circuit PDC shown in FIG. 2. The panel driving circuit PDC may receive predetermined voltages from the voltage generator PMIC shown in FIG. 2 and may output the first driving voltage VGH and the second driving voltage VGL.

Figure 10:
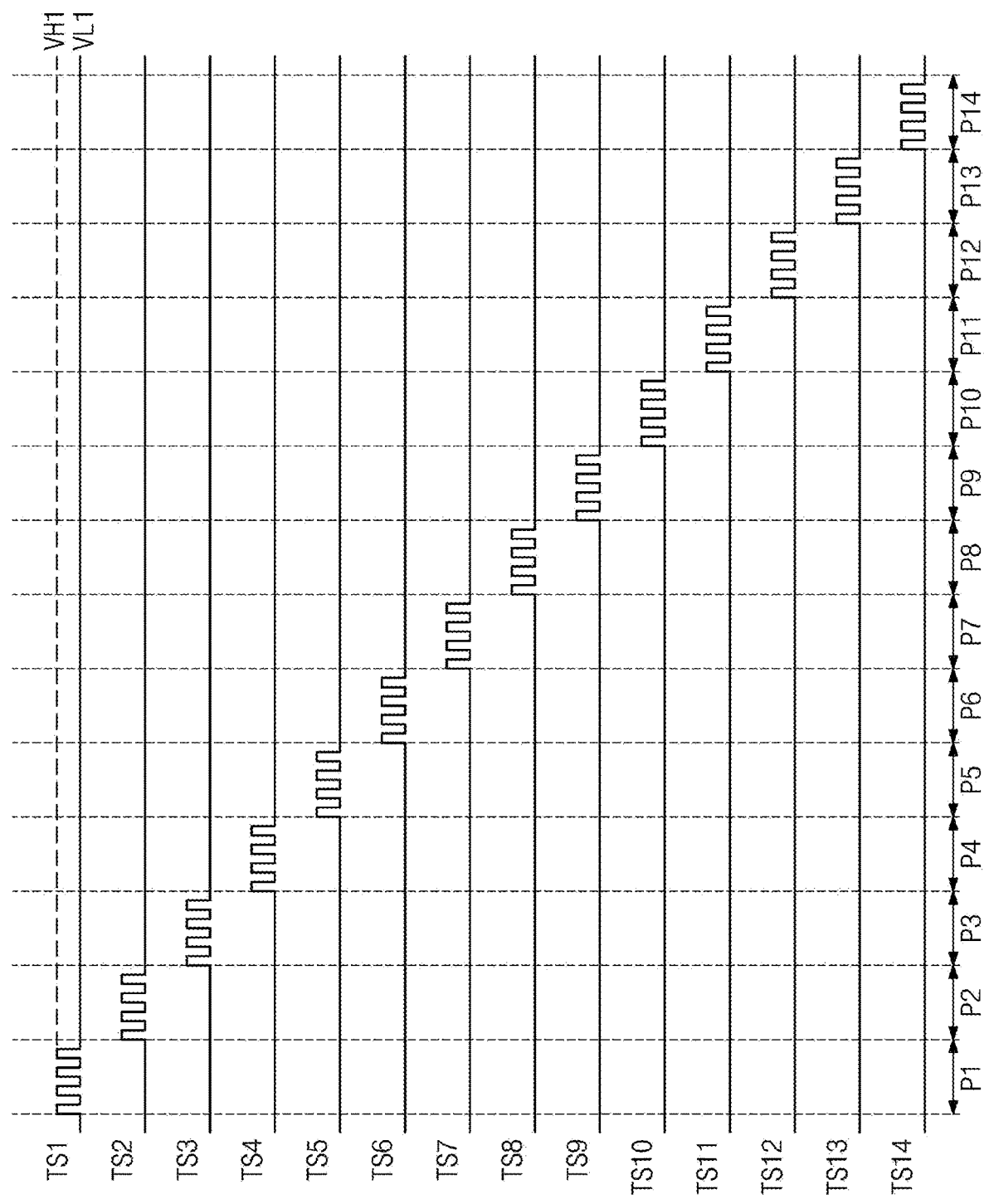
FIG. 10 is a timing diagram showing first to fourteenth low-voltage transmission signals output from a low-voltage transmitter of the readout circuit shown in FIG. 8.

FIG. 10 is a timing diagram showing the first to fourteenth low-voltage transmission signals TS1 to TS14 output from the low-voltage transmitter 110 of the readout circuit ROC shown in FIG. 8.

Referring to FIGS. 6, 8, and 10, the first to fourteenth low-voltage transmission signals TS1 to TS14 output from the low-voltage transmitter 110 of the readout circuit ROC may sequentially transition to an active level in the first to fourteenth periods P1, P2, P3, P4, P5, P6, P7, P8, P9, P10, P11, P12, P13 and P14, respectively. In an embodiment, each of the first to fourteenth low-voltage transmission signals TS1 to TS14 may have a voltage level between a first high voltage VH1 and a first low voltage VL1.

For example, the first low-voltage transmission signal TS1 may be a pulse signal periodically swinging between the first high voltage VH1 and the first low voltage VL1 during the first period P1. The second transmission signal TS2 may be a pulse signal periodically swinging between the first high voltage VH1 and the first low voltage VL1 during the second period P2. The fourteenth transmission signal TS14 may be a pulse signal periodically swinging between the first high voltage VH1 and the first low voltage VL1 during the fourteenth period P14.

Figure 11:
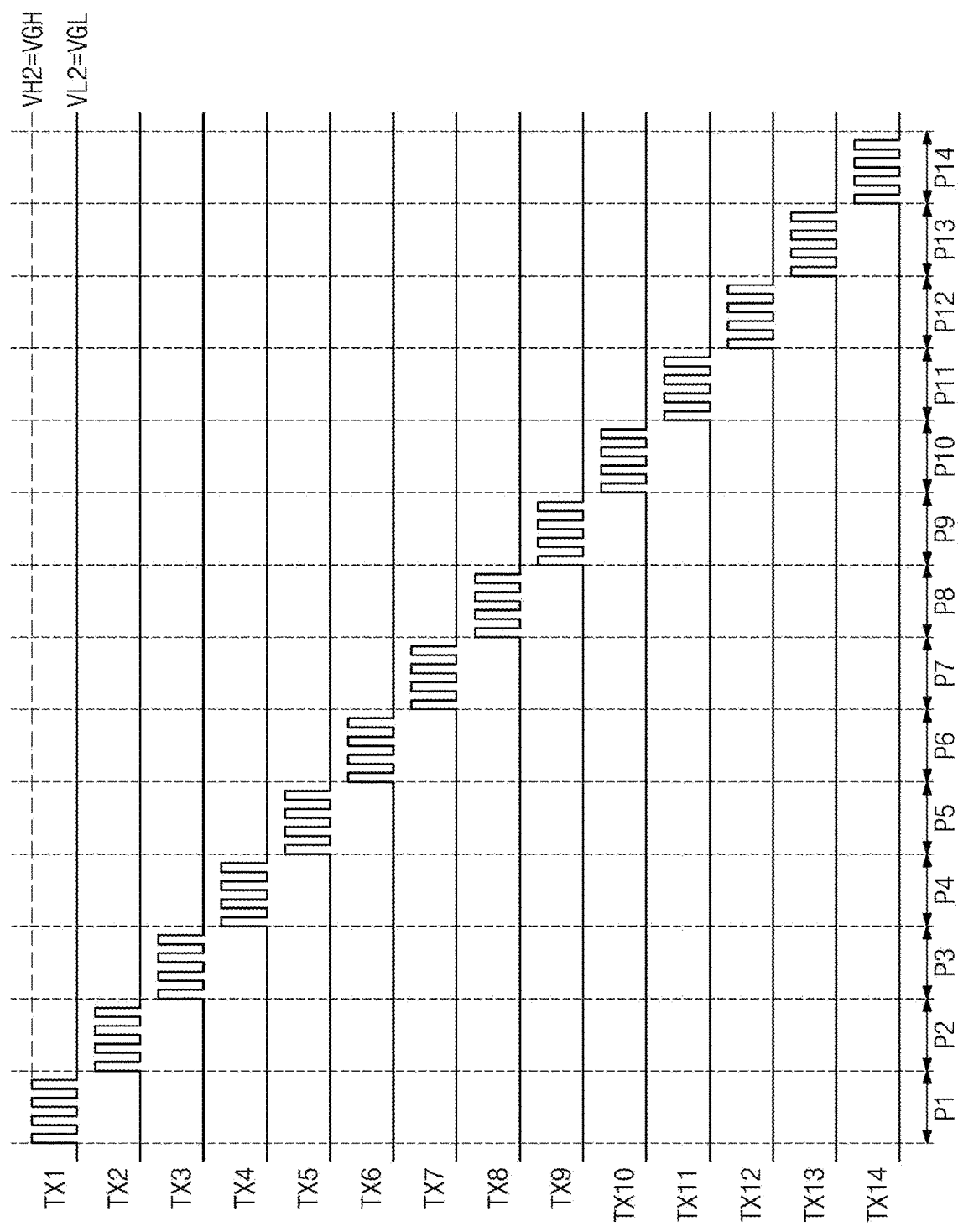
FIG. 11 is a timing diagram illustrating first to fourteenth transmission signals output from the output circuit shown in FIG. 9.

FIG. 11 is a timing diagram illustrating the first to fourteenth transmission signals TX1 to TX14 output from the output circuit OTC shown in FIG. 9.

Referring to FIGS. 6, 8, 10, and 11, the first to fourteenth transmission signals TX1 to TX14 output from the output circuit OTC may sequentially transition to an active level in the first to fourteenth periods P1 to P14, respectively. In an embodiment, each of the first to fourteenth transmission signals TX1 to TX14 may have a voltage level between a second high voltage VH2 and a second low voltage VL2.

For example, the first transmission signal TX1 may be a pulse signal that periodically swings between a second high voltage VH2 and a second low voltage VL2 during the first period P1. The second transmission signal TX2 may be a pulse signal that periodically swings between the second high voltage VH2 and the second low voltage VL2 during the second period P2. The fourteenth transmission signal TX14 may be a pulse signal that periodically swings between the second high voltage VH2 and the second low voltage VL2 during the fourteenth period P14.

In an embodiment, the first low voltage VL1 and the second low voltage VL2 may be at the same voltage level as each other. In an embodiment, the second high voltage VH2 may be a higher voltage level than the first high voltage VH1. In an embodiment, the second high voltage VH2 may be the same voltage level as the first driving voltage VGH. The second low voltage VL2 may be the same voltage level as the second driving voltage VGL In an embodiment, the first high voltage VH1 may be 3.3 V. The second high voltage VH2 may be 9 to 12 V. As a voltage level of each of the first to fourteenth transmission signals TX1 to TX14 increases to a sufficiently high voltage level (e.g., 9 to 12 V), touch sensitivity and touch recognition accuracy for the user input TC may be improved. The voltage level (or voltage range) of each of the first high voltage VH1 and the second high voltage VH2 is merely an example, and the present disclosure is not limited thereto.

Moreover, the low-voltage transmitter 110 in the readout circuit ROC outputs the first to fourteenth low-voltage transmission signals TS1 to TS14 of low-voltage level (e.g., 3.3 V). Accordingly, the readout circuit ROC may operate at a low-voltage level. As a result, the design of the readout circuit ROC can be made simpler, leading to a reduction in production costs.

Figure 12:
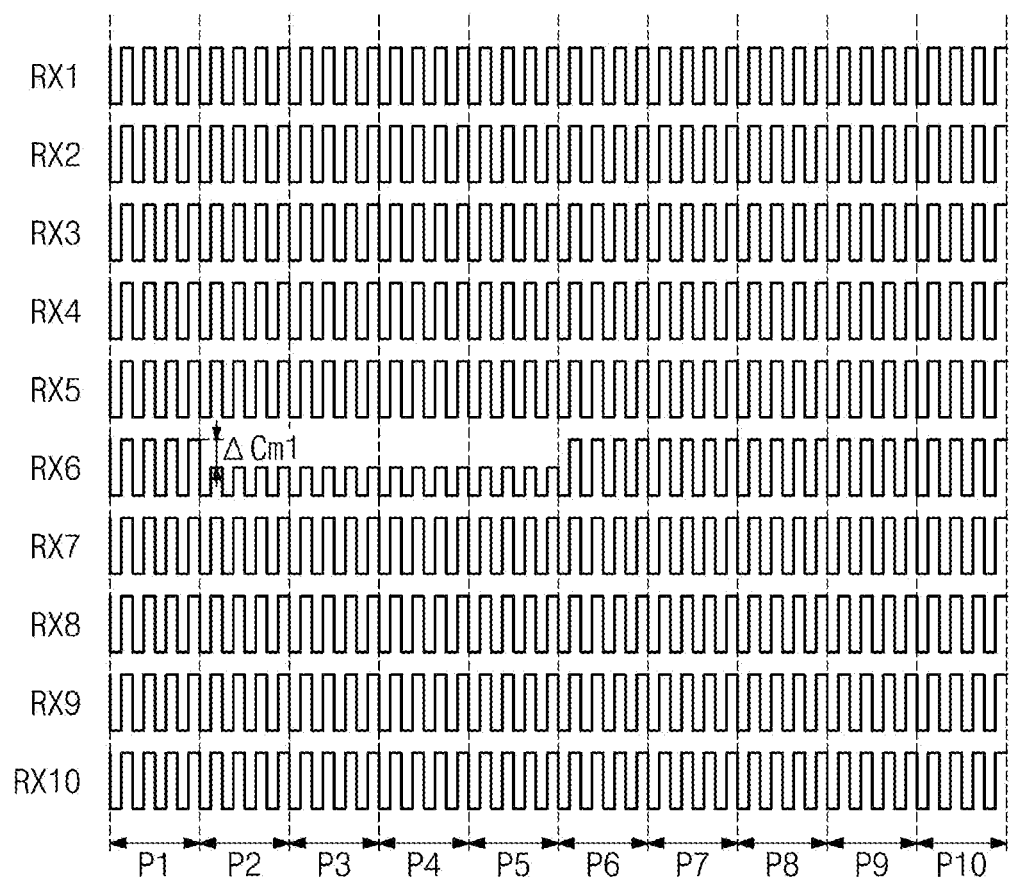
FIG. 12 is a timing diagram illustrating first to tenth reception signals provided to a receiver from first to tenth reception lines of an input sensor.

FIG. 12 is a timing diagram illustrating the first to tenth reception signals RX1 to RX10 provided to the receiver 120 from first to tenth reception lines RL1 to RL10 of the input sensor ISU.

Referring to FIGS. 6, 11, and 12, when the sequentially activated first to fourteenth transmission signals TX1 to TX14 are provided to the first to fourteenth transmission electrodes TE1 to TE14, a voltage (or current) of each of the first to tenth reception electrodes RE1 to RE10 may change depending on the capacitance between the first to fourteenth transmission electrodes TE1 to TE14 and the first to tenth reception electrodes RE1 to RE10. During the first to tenth periods P1 to P10, the readout circuit ROC may recognize a location of the user input TC (refer to FIG. 1) by a voltage (or current) difference ΔCm1 between the first to tenth reception signals RX1 to RX10. For example, the readout circuit ROC may identify the location of the user input TC based on the voltage (or current) difference ΔCm1 in the second to fifth periods P2 to P5.

The present disclosure is not limited to waveforms of the first to fourteenth low-voltage transmission signals TS1 to TS14, the first to fourteenth transmission signals TX1 to TX14 and the first to tenth reception signals RX1 to RX10 shown in FIGS. 10, 11, and 12. For example, in an embodiment, the first to fourteenth low-voltage transmission signals TS1 to TS14 and the first to fourteenth transmission signals TX1 to TX14 may be square waves, but they are not limited thereto, and may be either triangle waves or sine waves. The first to tenth reception signals RX1 to RX10 may vary depending on waveforms of the first to fourteenth transmission signals TX1 to TX14.

Figure 13:
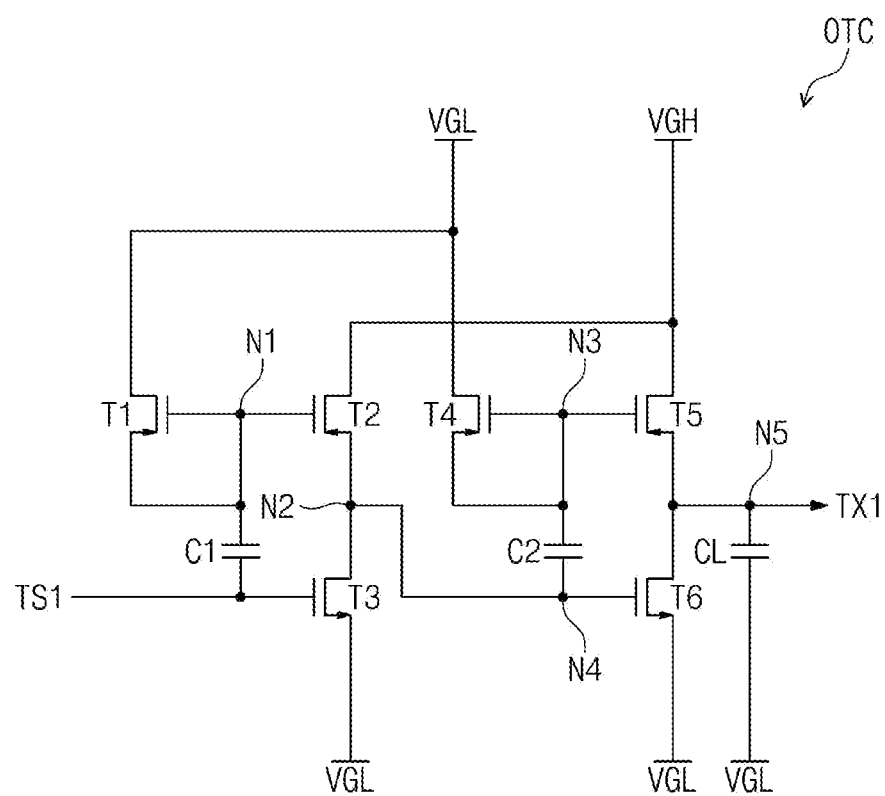
FIG. 13 is a circuit diagram of an output circuit, according to an embodiment of the present disclosure.

FIG. 13 is a circuit diagram of the output circuit OTC, according to an embodiment of the present disclosure.

FIG. 13 shows only a partial circuit (e.g., a circuit that converts the first low-voltage transmission signal TS1 to the first transmission signal TX1) of the output circuit OTC. The output circuit OTC may respectively convert the second to fourteenth low-voltage transmission signals TS2 to TS14 into the second to fourteenth transmission signals TX2 to TX14 by further including circuits similar to those that convert the first low-voltage transmission signal TS1 to the first transmission signal TX1.

Referring to FIG. 13, the output circuit OTC may be implemented as a level shifter including at least one transistor. In an embodiment, the output circuit OTC includes first to sixth transistors T1, T2, T3, T4, T5, and T6 and capacitors C1, C2, and CL.

The first transistor T1 is connected between a terminal provided with the second driving voltage VGL and a first node N1, and includes a gate electrode connected to the first node N1.

The second transistor T2 is connected between a terminal provided with the first driving voltage VGH and a second node N2, and includes a gate electrode connected to the first node N1. In this configuration, the gate electrodes of the first and second transistors T1 and T2 are connected to each other.

The third transistor T3 is connected between the second node N2 and a terminal provided with the second driving voltage VGL, and includes a gate electrode for receiving the first low-voltage transmission signal TS1.

The fourth transistor T4 is connected between a terminal provided with the second driving voltage VGL and a third node N3, and includes a gate electrode connected to the third node N3.

The fifth transistor T5 is connected between a terminal provided with the first driving voltage VGH and a fifth node N5, and includes a gate electrode connected to the third node N3. In this configuration, the gate electrodes of the fourth and fifth transistors T4 and T5 are connected to each other.

The sixth transistor T6 is connected between the fifth node N5 and a terminal provided with the second driving voltage VGL, and includes a gate electrode connected to the fourth node N4.

The capacitor C1 is connected between the first node N1 and a terminal receiving the first low-voltage transmission signal TS1. The capacitor C2 is connected between the third node N3 and the fourth node N4. The capacitor CL is connected between the fifth node N5 and the terminal provided with the second driving voltage VGL.

In an embodiment, the first, second, fourth, and fifth transistors T1, T2, T4, and T5 are P-type transistors, respectively, and third and sixth transistors T3 and T6 are N-type transistors, respectively.

In an embodiment, when the first low-voltage transmission signal TS1 has a square wave (or pulse wave), the output circuit OTC may include a level shifter shown in FIG. 13.

The output circuit OTC may receive the first low-voltage transmission signal TS1 and may output the first transmission signal TX1 swinging between the first driving voltage VGH and the second driving voltage VGL.

Figure 14:
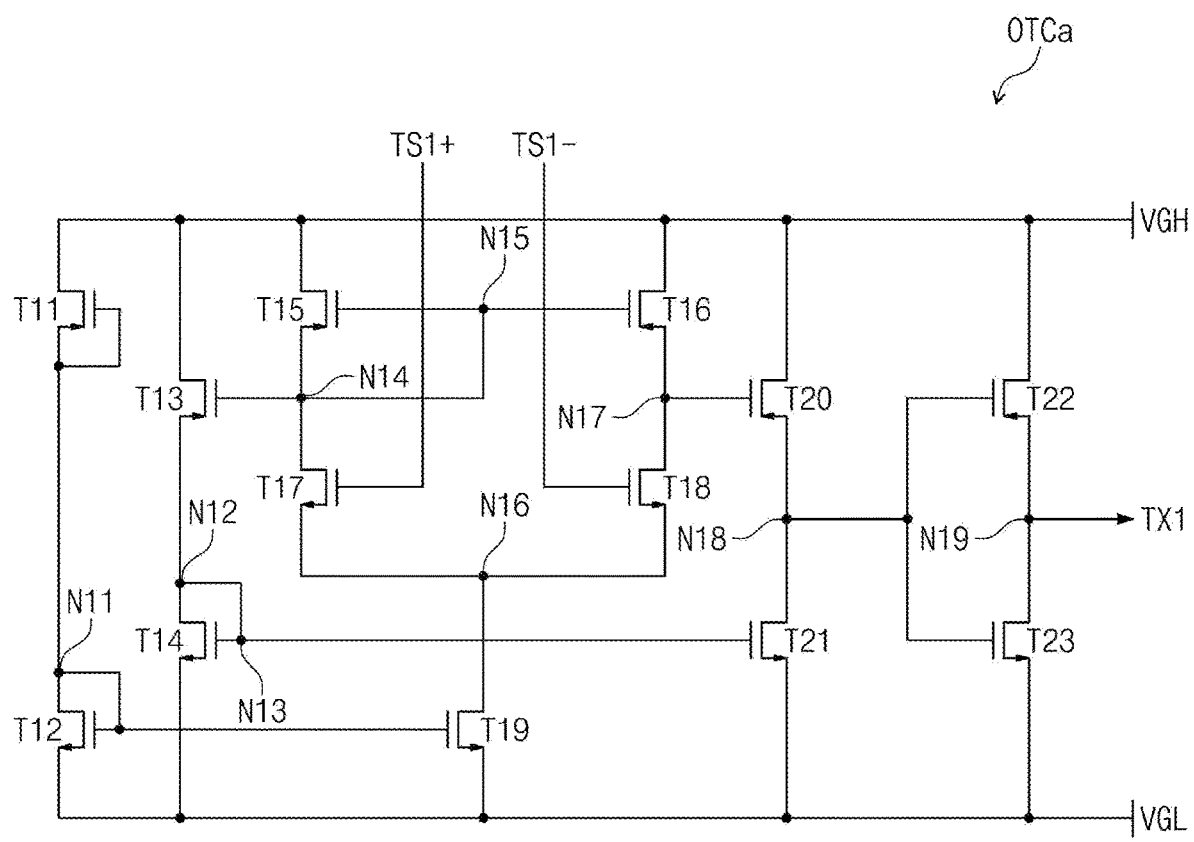
FIG. 14 is a circuit diagram of an output circuit, according to an embodiment of the present disclosure.

FIG. 14 is a circuit diagram of the output circuit OTCa, according to an embodiment of the present disclosure.

FIG. 14 shows only a partial circuit (e.g., a circuit that converts first low-voltage transmission signals TS1+ and TS1− to the first transmission signal TX1) of the output circuit OTCa. The output circuit OTCa may respectively convert the second to fourteenth low-voltage transmission signals TS2 to TS14 into the second to fourteenth transmission signals TX2 to TX14 by further including circuits similar to those that convert the first low-voltage transmission signal TS1 to the first transmission signal TX1. The first low-voltage transmission signals TS1+ and TS1− may be complementary to each other.

Referring to FIG. 14, the output circuit OTCa may be implemented as an amplifier including at least one transistor. In an embodiment, the output circuit OTCa includes eleventh to 23rd transistors T11 to T23.

The eleventh transistor T11 is connected between a terminal, to which the first driving voltage VGH is received, and an eleventh node N11, and includes a gate electrode connected with the eleventh node N11.

The twelfth transistor T12 is connected between the eleventh node N11 and a terminal to which the second driving voltage VGL is received, and includes a gate electrode connected to the eleventh node N11. The gate electrodes of the eleventh and twelfth transistors T11 and T12 are connected to each other.

The thirteenth transistor T13 is connected between the terminal, to which the first driving voltage VGH is received, and a twelfth node N12 and includes a gate electrode connected to a fourteenth node N14.

The fourteenth transistor T14 is connected between the twelfth node N12 and the terminal, to which the second driving voltage VGL is received, and includes a gate electrode connected to a thirteenth node N13.

The fifteenth transistor T15 is connected between the terminal, to which the first driving voltage VGH is received, and a fifteenth node N15 and includes a gate electrode connected to the fifteenth node N15.

The sixteenth transistor T16 is connected between the terminal, to which the first driving voltage VGH is received, and a seventeenth node N17 and includes a gate electrode connected to the fifteenth node N15. As can be seen, the gate electrodes of each of the thirteenth, fifteenth and sixteenth transistors T13, T15 and T16 are connected to the fifteenth node N15.

The seventeenth transistor T17 is connected between the fourteenth node N14 and a sixteenth node N16 and includes a gate electrode for receiving the first low-voltage transmission signal TS1+.

The eighteenth transistor T18 is connected between the seventeenth node N17 and the sixteenth node N16, and includes a gate electrode for receiving the first low-voltage transmission signal TS1−.

The nineteenth transistor T19 is connected between the sixteenth node N16 and the terminal to which the second driving voltage VGL is received, and includes a gate electrode connected to the eleventh node N11. In this case, the gate electrodes of the nineteenth, eleventh and twelfth transistors T19, T11 and T12 are connected to the eleventh node N11.

The twentieth transistor T20 is connected between the terminal, to which the first driving voltage VGH is received, and an eighteenth node N18, and includes a gate electrode connected to the seventeenth node N17.

The 21st transistor T21 is connected between the eighteenth node N18 and the terminal, to which the second driving voltage VGL is received, and includes a gate electrode connected to the thirteenth node N13 to which the gate electrode of the fourteenth transistor T14 is also connected.

The 22nd transistor T22 is connected between the terminal, to which the first driving voltage VGH is received, and a nineteenth node N19, and includes a gate electrode connected to the eighteenth node N18.

The 23rd transistor T23 is connected between the nineteenth node N19 and the terminal to which the second driving voltage VGL is received, and includes a gate electrode connected to the nineteenth node N19. In this case, the gate electrodes of the 22nd and 23rd transistor T22 and T23 are connected to each other.

In an embodiment, the eleventh, thirteenth, fifteenth, sixteenth, twentieth and 22nd transistors T11, T13, T15, T16, T20, and T22 are P-type transistors, respectively. The twelfth, fourteenth, seventeenth, eighteenth, nineteenth, 21st and 23rd transistors T12, T14, T17, T18, T19, T21, and T23 are N-type transistors, respectively.

In an embodiment, when the first low-voltage transmission signal TS1 has a triangular wave or a sine wave, the output circuit OTC shown in FIG. 2 may be implemented as the output circuit OTCa including the amplifier shown in FIG. 14.

The output circuit OTCa may receive the pair of first low-voltage transmission signals TS1+ and TS1−, and may output the first transmission signal TX1 swinging between the first driving voltage VGH and the second driving voltage VGL.

Figure 15:
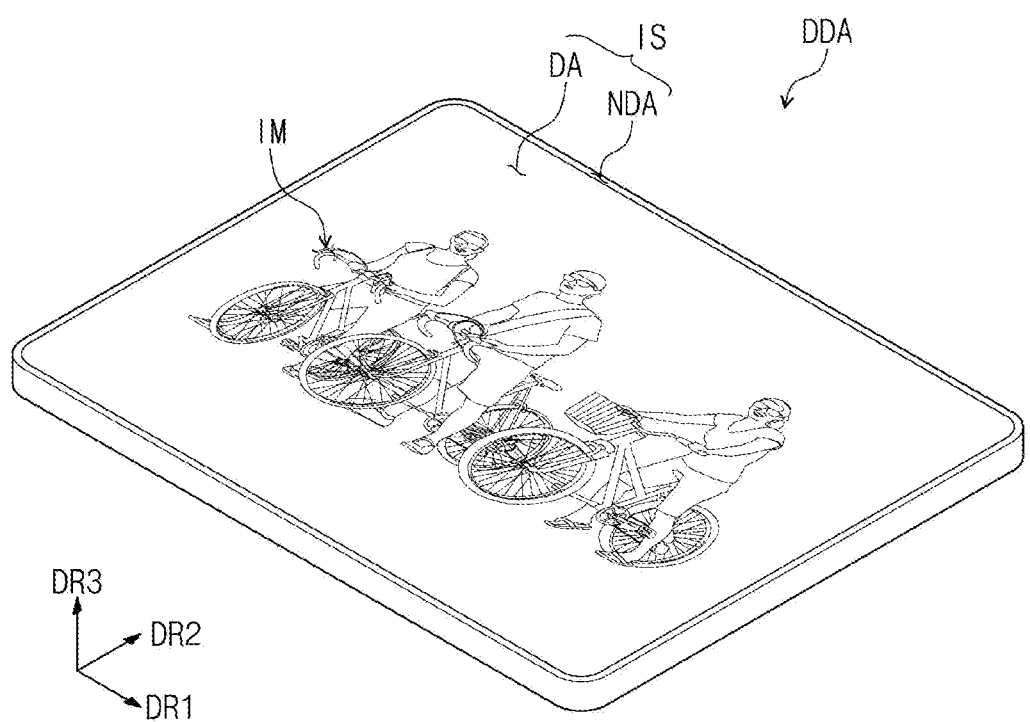
FIG. 15 is a perspective view of a display device, according to an embodiment of the present disclosure.
Figure 16:
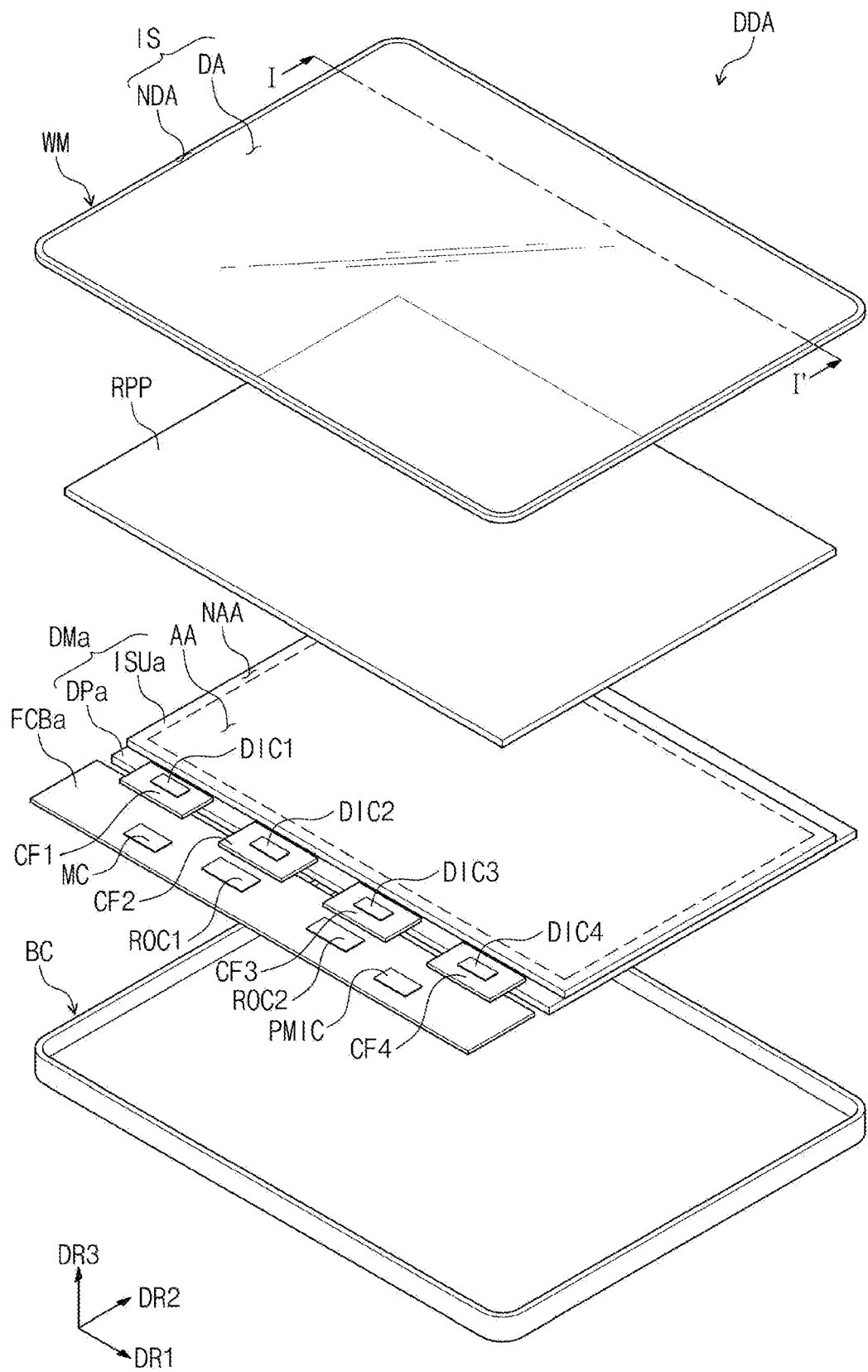
FIG. 16 is an exploded perspective view of a display device, according to an embodiment of the present disclosure.

FIG. 15 is a perspective view of a display device DDA, according to an embodiment of the present disclosure. FIG. 16 is an exploded perspective view of the display device DDA, according to an embodiment of the present disclosure.

Referring to FIGS. 15 and 16, the display device DDA may be a device that is activated depending on an electrical signal. The display device DDA according to the present disclosure may be a medium-sized display device, such as a tablet PC, a notebook computer, or a vehicle navigation system as well as a large-sized display device, such as a television or a monitor. The above examples are provided only as examples, and it is to be understood that the display device DD may be applied to any other display device(s) in accordance with the present disclosure. The display device DDA is in a shape of a rectangle having a long side in the first direction DR1 and a short side in the second direction DR2 intersecting the first direction DR1. However, the shape of the display device DDA is not limited thereto. For example, the display device DDA may be implemented in various shapes. The display device DDA may display the image IM on the display surface IS parallel to each of the first direction DR1 and the second direction DR2, to face the third direction DR3.

Hereinafter, the same reference numerals are used for the same components as components of the display device DD illustrated in FIGS. 1 and 2, and thus additional descriptions are omitted to avoid redundancy.

The display module DMa of the display device DDA includes a display panel DPa and an input sensor ISUa.

The display device DDA may include connection boards CF1, CF2, CF3, and CF4 and a circuit board FCBa. In an embodiment, each of the connection boards CF1, CF2, CF3, and CF4 and the circuit board FCBa may be a flexible printed circuit board.

Driving circuits DIC1, DIC2, DIC3, and DIC4 may be disposed on the connection boards CF1, CF2, CF3, and CF4, respectively. The driving circuits DIC1, DIC2, DIC3, and DIC4 may output signals for driving the data lines DL (refer to FIG. 5) disposed on the display panel DP. FIG. 16 illustrates that the driving circuits DIC1, DIC2, DIC3, and DIC4 are mounted on the connection boards CF1, CF2, CF3, and CF4, respectively, but the present disclosure is not limited thereto. The driving circuits DIC1, DIC2, DIC3, and DIC4 may be directly mounted on the display panel DP. In an embodiment, the driving circuits DIC1, DIC2, DIC3, and DIC4 may be mounted on the circuit board FCBa to be electrically connected to the display panel DP.

The circuit board FCBa may be electrically connected to the display panel DP through connection boards. The circuit board FCBa may include a plurality of driving elements. The plurality of driving elements may include circuits for driving the display panel DP, the main controller MC, the voltage generator PMIC, a first readout circuit ROC1 for driving the input sensor ISU, and a second readout circuit ROC2 for driving the input sensor ISU. In an embodiment, the main controller MC and the voltage generator PMIC may be positioned on a separate circuit board electrically connected to the circuit board FCBa.

Figure 17:
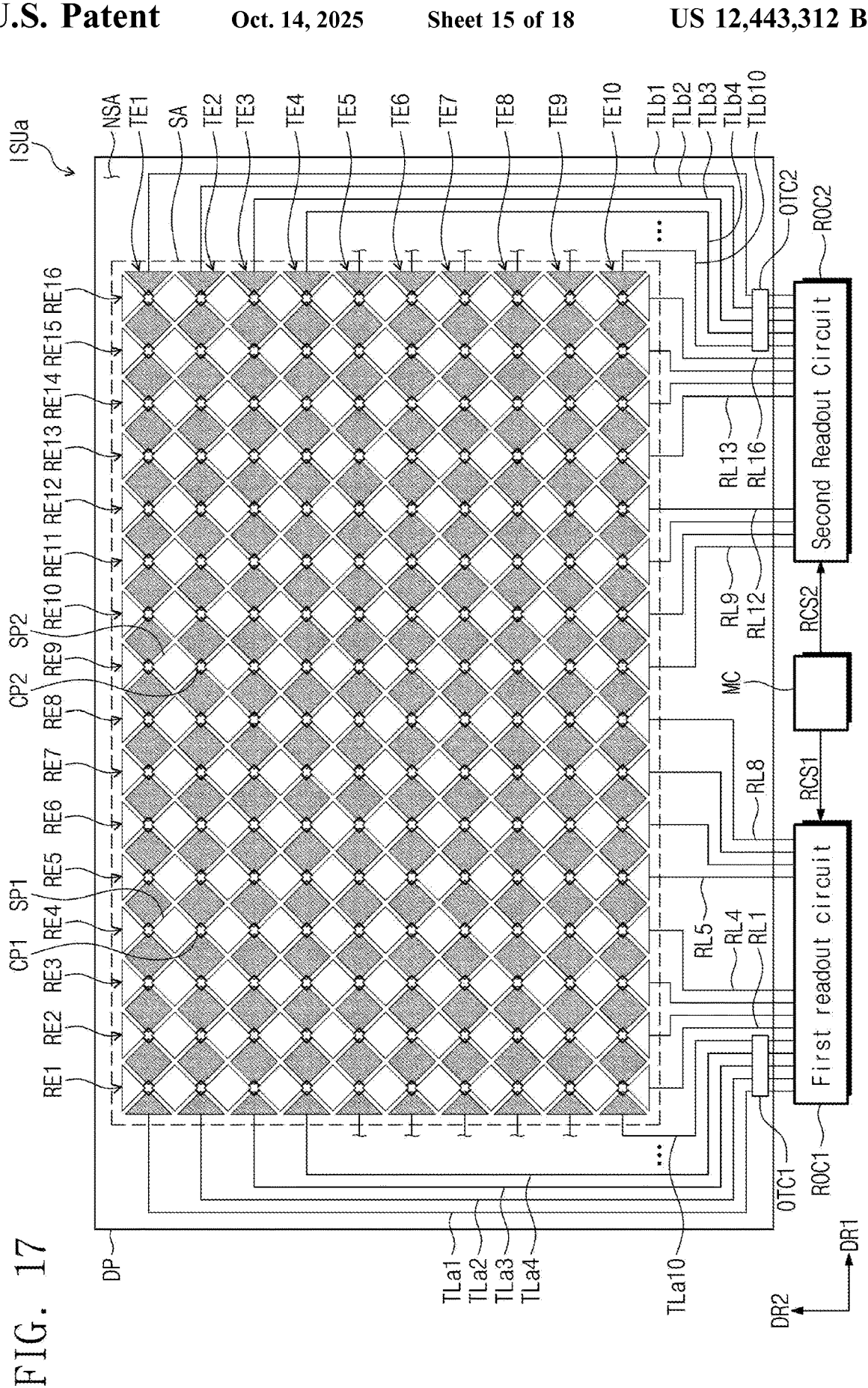
FIG. 17 is a diagram illustrating a connection relationship between an input sensor and readout circuits, according to an embodiment of the present disclosure.

FIG. 17 is a diagram illustrating a connection relationship between an input sensor ISUa and readout circuits ROC1 and ROC2, according to an embodiment of the present disclosure.

Referring to FIG. 17, the input sensor ISUa includes first to tenth transmission electrodes TE1 to TE10 and first to sixteenth reception electrodes RE1 to RE16.

FIG. 17 illustrates that the input sensor ISUa includes the first to tenth transmission electrodes TE1 to TE10 and the first to sixteenth reception electrodes RE1 to RE16 due to space limitations, but the present disclosure is not limited thereto. In an embodiment, the number of transmission electrodes and reception electrodes positioned in the input sensor ISUa may be greater than the number of transmission electrodes and reception electrodes of the input sensor ISU illustrated in FIG. 6.

The input sensor ISUa may further include first to tenth left transmission lines TLa1 to TLa10, first to tenth right transmission lines TLb1 to TLb10, and first to sixteenth reception lines RL1 to RL16. The first to tenth left transmission lines TLa1 to TLa10, the first to tenth right transmission lines TLb1 to TLb10, and the first to sixteenth reception lines RL1 to RL16 may be positioned in the non-sensing area NSA. The first to sixteenth reception lines RL1 to RL16 may be electrically connected to one side of the first to sixteenth reception electrodes RE1 to RE16. The first to tenth left transmission lines TLa1 to TLa10 are electrically connected to a first end (or a left side) of the first to tenth transmission electrodes TE1 to TE10. The first to tenth right transmission lines TLb1 to TLb10 are electrically connected to a second end (or a right side) of the first to tenth transmission electrodes TE1 to TE10.

When the length of the first direction DR1 of the large-sized display device DDA is long, transmission signals transmitted to the first to tenth transmission electrodes TE1 to TE10 may be affected by noise, coupling capacitance, and the like. As shown in FIG. 17, since the first to tenth left transmission lines TLa1 to TLa10 are connected to the left side of the first to tenth transmission electrodes TE1 to TE10 and the first to tenth right transmission lines TLb1 to TLb10 are connected to the right side of the first to tenth transmission electrodes TE1 to TE10, transmission signals may be provided at the same time, thereby improving touch sensitivity and touch recognition accuracy.

The display module DMa further includes a first output circuit OTC1 and a second output circuit OTC2. The first output circuit OTC1 and the second output circuit OTC2 may be positioned on the display panel DPa shown in FIG. 16. The first output circuit OTC1 may be connected to the first readout circuit ROC1 and the second output circuit OTC2 may be connected to the second readout circuit ROC2.

The first to tenth left transmission lines TLa1 to TLa10 are electrically connected to the first readout circuit ROC1 through the first output circuit OTC1. The first to tenth right transmission lines TLb1 to TLb10 are electrically connected to the second readout circuit ROC2 through the second output circuit OTC2.

The first to eighth reception lines RL1 to RL8 are electrically connected to the first readout circuit ROC1. In other words, a first portion of the reception lines is connected to the first readout circuit ROC1. The ninth to sixteenth reception lines RL9 to RL16 are electrically connected to the second readout circuit ROC2. In other words, a second portion of the reception lines is connected to the second readout circuit ROC2.

Each of the first readout circuit ROC1 and the second readout circuit ROC2 may include the same circuit configuration as the readout circuit ROC shown in FIG. 8.

The main controller MC may output a first readout control signal RCS1 to the first readout circuit ROC1 and may output a second readout control signal RCS2 to the second readout circuit ROC2.

Figure 18:
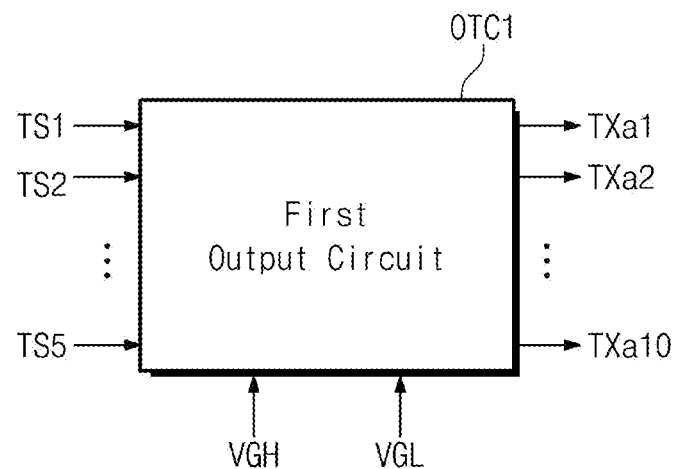
FIG. 18 is a block diagram showing a first output circuit, according to an embodiment of the present disclosure.

FIG. 18 is a block diagram showing the first output circuit OTC1, according to an embodiment of the present disclosure.

Referring to FIGS. 17 and 18, the first output circuit OTC1 receives first to fifth low-voltage transmission signals TS1 to TS5 provided from the first readout circuit ROC1.

The first output circuit OTC1 changes voltage levels of the first to fifth low-voltage transmission signals TS1 to TS5 and outputs first to tenth left transmission signals TXa1 to TXa10. The first to tenth left transmission signals TXa1 to TXa10 may be provided to the first to tenth left transmission lines TLa1 to TLa10 shown in FIG. 17, respectively.

The first output circuit OTC1 receives the first driving voltage VGH and the second driving voltage VGL. The first driving voltage VGH and the second driving voltage VGL may be voltages provided from the voltage generator PMIC shown in FIG. 16. The first output circuit OTC1 may output the first to tenth left transmission signals TXa1 to TXa10, each of which swings between the first driving voltage VGH and the second driving voltage VGL.

The second output circuit OTC2 may include a circuit configuration similar to that of the first output circuit OTC1. For example, in response to five low-voltage transmission signals provided from the second readout circuit ROC2, the second output circuit OTC2 may output right transmission signals to the first to tenth right transmission lines TLb1 to TLb10 shown in FIG. 17, respectively.

Figure 19:
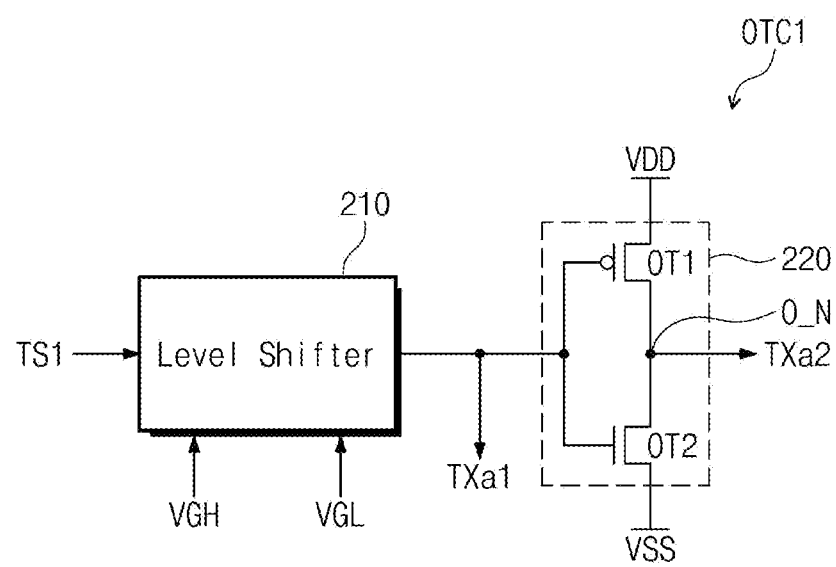
FIG. 19 is a circuit diagram of a first output circuit, according to an embodiment of the present disclosure.

FIG. 19 is a circuit diagram of the first output circuit OTC1, according to an embodiment of the present disclosure.

FIG. 19 shows only a partial circuit (e.g., a circuit that converts the first low-voltage transmission signal TS1 into a first left transmission signal TXa1 and a second left transmission signal TXa2) of the first output circuit OTC1. The first output circuit OTC1 may convert the second to fifth low-voltage transmission signals TS2 to TS5 into third to tenth left transmission signals TXa3 to TXa10 by further including circuits similar to a circuit that converts the first low-voltage transmission signal TS1 to the first left transmission signal TXa1 and the second left transmission signal TXa2.

Referring to FIG. 19, the first output circuit OTC1 includes a level shifter 210 and an inverter circuit 220.

The level shifter 210 receives the first low-voltage transmission signal TS1 and outputs the first left transmission signal TXa1. The level shifter 210 receives the first driving voltage VGH and the second driving voltage VGL. The first left transmission signal TXa1 may be a signal swinging between the first driving voltage VGH and the second driving voltage VGL.

The inverter circuit 220 includes a first output transistor OT1 and a second output transistor OT2. The first output transistor OT1 is connected between a terminal, to which a power supply voltage VDD is input, and an output node O_N and includes a gate electrode for receiving the first left transmission signal TXa1. The second output transistor OT2 is connected between the output node O_N and a terminal, to which a ground voltage VSS is input, and includes a gate electrode for receiving the first left transmission signal TXa1.

The second left transmission signal TXa2 is output to the output node O_N of the inverter circuit 220. The second left transmission signal TXa2 may be a signal obtained by inverting the phase of the first left transmission signal TXa1.

The first left transmission signal TXa1 may be provided to the first transmission electrode TE1 through the first left transmission line TLa1. The second left transmission signal TXa2 may be provided to the second transmission electrode TE2 through the second left transmission line TLa2.

Returning to FIG. 18, the first output circuit OTC1 may receive the first to fifth low-voltage transmission signals TS1 to TS5 and may output the first to tenth left transmission signals TXa1 to TXa10. In other words, the number of signals output from the first output circuit OTC1 is twice the number of input signals input to the first output circuit OTC1.

The first readout circuit ROC1 shown in FIG. 17 may output the first to fifth low-voltage transmission signals TS1 to TS5, of which the number is half the number of the first to tenth left transmission lines TLa1 to TLa10. Accordingly, the circuit area of the first readout circuit ROC1 and the number of output pads of the first readout circuit ROC1 may be minimized. Similarly to the first readout circuit ROC1, the circuit configuration of the second readout circuit ROC2 may also be minimized.

In an embodiment, when the first low-voltage transmission signal TS1 is a square wave (or pulse wave), the first output circuit OTC1 may include the level shifter 210. The level shifter 210 may include the circuit configuration shown in FIG. 13.

When the first low-voltage transmission signal TS1 is a triangular or sine wave, the first output circuit OTC1 may include the amplifier shown in FIG. 14 instead of the level shifter 210.

Figure 20:
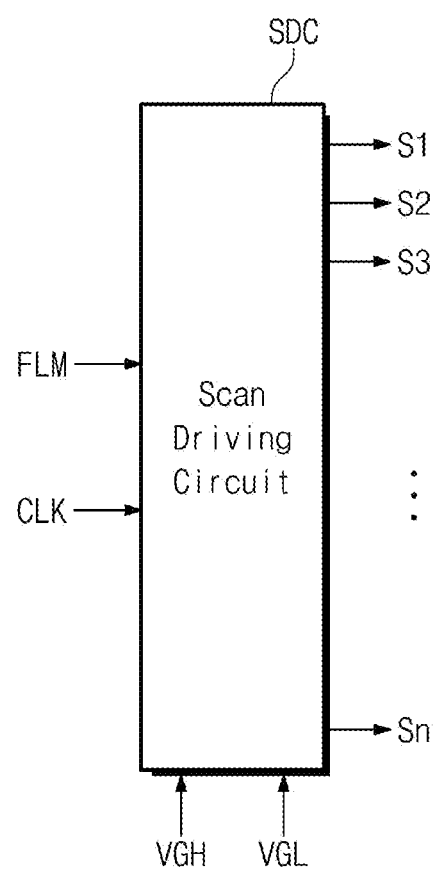
FIG. 20 is a block diagram of a scan driving circuit, according to an embodiment of the present disclosure.

FIG. 20 is a block diagram of the scan driving circuit SDC, according to an embodiment of the present disclosure.

Referring to FIG. 20, the scan driving circuit SDC receives a start signal FLM, a clock signal CLK, the first driving voltage VGH and the second driving voltage VGL. The start signal FLM and the clock signal CLK may be provided from the panel driving circuit PDC shown in FIG. 5. The first driving voltage VGH and the second driving voltage VGL may be provided from the voltage generator PMIC shown in FIG. 2.

The scan driving circuit SDC may output scan signals S1 to Sn, each of which swings between the first driving voltage VGH and the second driving voltage VGL, in response to the start signal FLM and the clock signal CLK. The scan signals S1 to Sn may be provided to the scan lines SL shown in FIG. 5.

Figure 21:
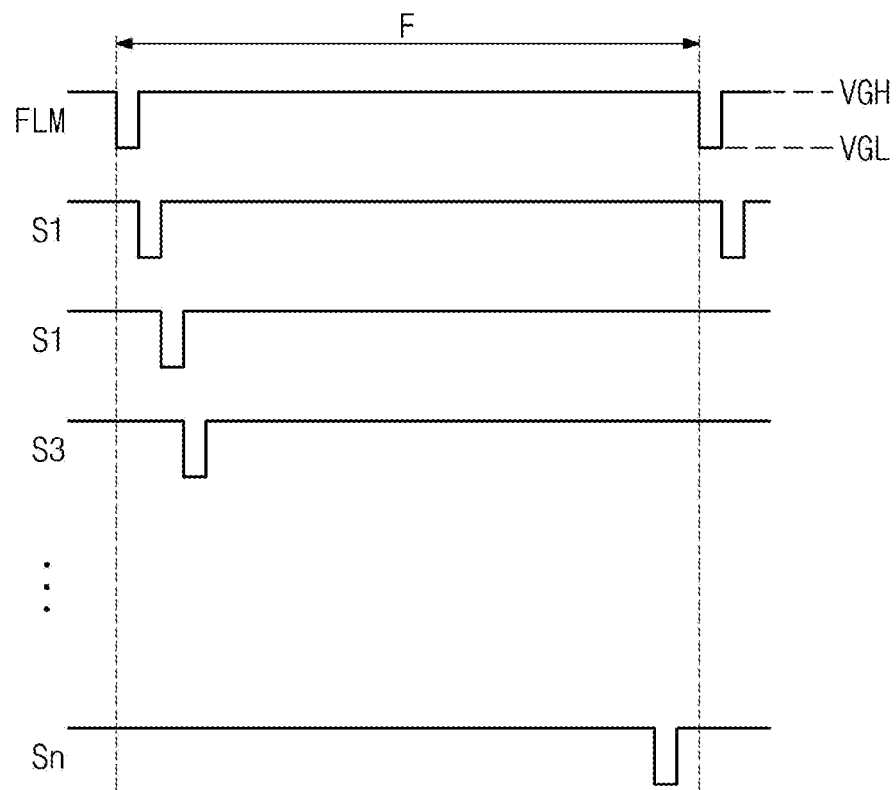
FIG. 21 is a timing diagram illustrating scan signals output from a scan driving circuit.

FIG. 21 is a timing diagram illustrating scan signals S1 to Sn output from the scan driving circuit SDC.

Referring to FIGS. 20 and 21, the start signal FLM is a signal indicating the start of one frame 'F'. The scan driving circuit SDC may sequentially output the scan signals S1 to Sn to be at an active level (e.g., a low level) during the one frame 'F' in response to the start signal FLM and the clock signal CLK.

Each of the scan signals S1 to Sn may be a pulse signal swinging between the first driving voltage VGH and the second driving voltage VGL.

The output circuit OTC shown in FIG. 9 may convert the first to fourteenth low-voltage transmission signals TS1 to TS14 into the first to fourteenth transmission signals TX1 to TX14 by using the first driving voltage VGH and the second driving voltage VGL provided by the scan driving circuit SDC. Accordingly, the voltage generator PMIC shown in FIG. 2 does not need to generate separate voltages for the output circuit OTC.

The design of a display device with the aforementioned configuration allows for the readout circuit to operate at a low voltage, resulting in a low voltage output signal and reduced production costs. Additionally, the display device may include an output circuit that can convert the low voltage output signal into a high voltage transmission signal. By providing a high voltage transmission signal to an input sensor, a user's input can be more accurately detected.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
   a display panel;
   an input sensor disposed on the display panel and including a transmission electrode and a reception electrode;
   a readout circuit configured to output a low-voltage transmission signal and to receive a reception signal from the reception electrode; and
   an output circuit configured to convert the low-voltage transmission signal into a transmission signal and to provide the transmission signal to the transmission electrode.

2. The display device of claim 1, wherein the low-voltage transmission signal has a voltage level between a first high voltage and a first low voltage, and the transmission signal has a voltage level between a second high voltage and a second low voltage, and
   wherein the second high voltage is higher than the first high voltage.

3. The display device of claim 2, further comprising:
   a voltage generator configured to generate a first driving voltage and a second driving voltage,
   wherein the output circuit receives the first driving voltage and the second driving voltage and outputs the transmission signal that swings between the second high voltage and the second low voltage.

4. The display device of claim 3, wherein the display panel further includes:
   a pixel connected to a scan line and a data line; and
   a scan driving circuit configured to receive the first driving voltage and the second driving voltage and to provide a scan signal to the scan line, and
   wherein the scan signal swings between the first driving voltage and the second driving voltage.

5. The display device of claim 1, wherein the readout circuit includes:
   a receiver configured to receive the reception signal and to output a reception sensing signal;
   an analog-to-digital converter configured to convert the reception sensing signal into a digital signal and to output a digital sensing signal;
   a touch processor configured to calculate coordinates of an input of a user based on the digital sensing signal; and a low-voltage transmitter configured to output an output signal as the low-voltage transmission signal.

6. The display device of claim 1, wherein the output circuit includes a level shifter including at least one transistor.

7. The display device of claim 1, wherein the output circuit includes an amplifier including at least one transistor.

8. The display device of claim 1, further comprising:
a printed circuit board electrically connected to the display panel,
wherein the readout circuit is disposed on the printed circuit board and the output circuit is disposed on the display panel.

9. The display device of claim 1, wherein the output circuit includes:
a level shifter configured to convert the low-voltage transmission signal to a first transmission signal and to output the first transmission signal; and
an inverter configured to output a second transmission signal by inverting the first transmission signal.

10. The display device of claim 9, wherein the input sensor includes a first transmission electrode and a second transmission electrode, and
wherein the first transmission signal is provided to the first transmission electrode, and the second transmission signal is provided to the second transmission electrode.

11. A display device comprising:
a display panel;
an input sensor disposed on the display panel and including a plurality of transmission electrodes and a plurality of reception electrodes;
a first readout circuit configured to output first low-voltage transmission signals and to receive first reception signals from a first portion of the plurality of reception electrodes;
a second readout circuit configured to output second low-voltage transmission signals and to receive second reception signals from a second portion of the plurality of reception electrodes;
a first output circuit configured to convert the first low-voltage transmission signals to first transmission signals and to respectively provide the first transmission signals to first ends of the plurality of transmission electrodes; and
a second output circuit configured to convert the second low-voltage transmission signals to second transmission signals and to respectively provide the second transmission signals to second ends of the plurality of transmission electrodes.

12. The display device of claim 11, wherein each of the first low-voltage transmission signals has a voltage level between a first high voltage and a first low voltage, and each of the second low-voltage transmission signals has a voltage level between the first high voltage and the first low voltage,
wherein each of the first transmission signals has a voltage level between a second high voltage and a second low voltage, and each of the second transmission signals has a voltage level between the second high voltage and the second low voltage, and
wherein the second high voltage is higher than the first high voltage.

13. The display device of claim 12, further comprising:
a voltage generator configured to generate a first driving voltage and a second driving voltage,
wherein the first output circuit receives the first driving voltage and the second driving voltage and outputs the first transmission signals, each of which swings between the second high voltage and the second low voltage, and
wherein the second output circuit receives the first driving voltage and the second driving voltage and outputs the second transmission signals, each of which swings between the second high voltage and the second low voltage.

14. The display device of claim 13, wherein the display panel further includes:
a pixel connected to a scan line and a data line; and
a scan driving circuit configured to receive the first driving voltage and the second driving voltage and to provide a scan signal to the scan line, and
wherein the scan signal swings between the first driving voltage and the second driving voltage.

15. The display device of claim 11, wherein the first readout circuit includes:
a receiver configured to receive the first reception signals and to output a reception sensing signal;
an analog-to-digital converter configured to convert the reception sensing signal into a digital signal and to output a digital sensing signal;
a touch processor configured to calculate coordinates of an input of a user based on the digital sensing signal; and
a low-voltage transmitter configured to output an output signal as the first low-voltage transmission signals and the second low-voltage transmission signals.

16. The display device of claim 11, wherein the first output circuit includes a level shifter including at least one transistor.

17. The display device of claim 11, wherein the first output circuit includes an amplifier including at least one transistor.

18. The display device of claim 11, further comprising:
a printed circuit board electrically connected to the display panel,
wherein each of the first readout circuit and the second readout circuit is disposed on the printed circuit board, and the first output circuit and the second output circuit are disposed on the display panel.

19. The display device of claim 11, wherein the plurality of transmission electrodes of the input sensor include a first transmission electrode and a second transmission electrode.

20. The display device of claim 19, wherein the first output circuit includes:
a level shifter configured to convert one of the first low-voltage transmission signals into a first signal and to output the first signal; and
an inverter configured to output a second signal by inverting the first signal, and
wherein the first signal is provided to a first end of the first transmission electrode, and the second signal is provided to a first end of the second transmission electrode.

* * * * *